(12) United States Patent
Jang et al.

(10) Patent No.: US 11,228,669 B2
(45) Date of Patent: Jan. 18, 2022

(54) ELECTRONIC DEVICE FOR CONTROLLING APPLICATION ACCORDING TO FOLDING ANGLE AND METHOD THEREOF

(71) Applicant: Samsung Electronics Co., Ltd., Gyeonggi-do (KR)

(72) Inventors: Minsuk Jang, Gyeonggi-do (KR); Donghwan Bae, Gyeonggi-do (KR); Youngseok Park, Gyeonggi-do (KR); Sooyoun Park, Gyeonggi-do (KR); Kyuok Choi, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 118 days.

(21) Appl. No.: 16/448,244

(22) Filed: Jun. 21, 2019

(65) Prior Publication Data

US 2020/0128116 A1    Apr. 23, 2020

(30) Foreign Application Priority Data

Oct. 17, 2018  (KR) .......................... 10-2018-0123890

(51) Int. Cl.
*H04M 1/02* (2006.01)
*H04M 1/72442* (2021.01)
(Continued)

(52) U.S. Cl.
CPC ....... *H04M 1/0241* (2013.01); *H04M 1/0216* (2013.01); *H04M 1/72442* (2021.01); *H04M 1/72469* (2021.01); *G06K 9/00087* (2013.01)

(58) Field of Classification Search
CPC ........... H04M 1/0241; H04M 1/72442; H04M 1/72469; H04M 1/0216; H04M 1/0214;
(Continued)

(56) References Cited

U.S. PATENT DOCUMENTS 8,803,816 B2 * 8/2014 Kilpatrick, II ...... H04M 1/0247
345/173
9,684,342 B2   6/2017 Kim et al.
(Continued)

FOREIGN PATENT DOCUMENTS

KR    10-2015-0081394 A    7/2015
KR    10-2015-0094477 A    8/2015
(Continued)

OTHER PUBLICATIONS

International Search Report dated Oct. 17, 2019.
European Search Report dated Aug. 10, 2021.

*Primary Examiner* — Brandon J Miller
(74) *Attorney, Agent, or Firm* — Cha & Reiter, LLC

(57) ABSTRACT

An electronic device includes a foldable housing including a first surface and a second surface opposite to the first surface, a first display arranged on the first surface and configured to be flexible, a second display arranged in at least a partial area of the second surface, and a processor arranged inside the foldable housing. The processor detects that the foldable housing is unfolded to a first angle from a fully folded state, displays a first GUI associated with a first application on at least a partial area of the display, detects that the foldable housing is unfolded to a second angle greater than the first angle, displays a second GUI associated with a second application, and executes the second application when the foldable housing is folded back into the fully folded state.

20 Claims, 23 Drawing Sheets

(51) Int. Cl.
*H04M 1/72469* (2021.01)
*G06K 9/00* (2006.01)

(58) Field of Classification Search
CPC ........... H04M 1/0243; H04M 1/72403; H04M
1/642; H04M 1/0268; H04M 2250/16;
G06K 9/00087; G06Q 20/353; G06Q
20/322; G06F 2203/04102; G06F 1/1677;
G06F 1/1652; G06F 1/1616; G06F
3/0481; G06F 3/0485; G06F 3/0488;
G06F 1/1647

See application file for complete search history.

(56) References Cited

U.S. PATENT DOCUMENTS

| | | | |
|---|---|---|---|
| 9,746,883 B2 | 8/2017 | Lee et al. | |
| 9,830,075 B2 | 11/2017 | Kim et al. | |
| 10,133,310 B2 | 11/2018 | Kim et al. | |
| 10,254,863 B2 * | 4/2019 | Shin | G06F 1/1677 |
| 10,331,341 B2 | 6/2019 | Ryu et al. | |
| 10,491,740 B2 * | 11/2019 | Tanabe | G06F 1/1626 |
| 2004/0214612 A1 * | 10/2004 | Park | H04M 1/0212 |
| | | | 455/566 |
| 2010/0182265 A1 | 7/2010 | Kim et al. | |
| 2010/0218663 A1 * | 9/2010 | Choi | G11B 19/025 |
| | | | 84/609 |
| 2014/0218321 A1 | 8/2014 | Lee et al. | |
| 2015/0215447 A1 * | 7/2015 | Chae | H04M 1/72469 |
| | | | 455/564 |
| 2015/0338888 A1 | 11/2015 | Kim et al. | |
| 2016/0026381 A1 | 1/2016 | Kim et al. | |
| 2016/0098063 A1 | 4/2016 | Lee et al. | |
| 2016/0132074 A1 | 5/2016 | Kim et al. | |
| 2016/0132292 A1 * | 5/2016 | Jeoung | H04M 1/72433 |
| | | | 715/727 |
| 2016/0184700 A1 * | 6/2016 | Lee | G06F 1/1613 |
| | | | 463/31 |
| 2016/0187994 A1 | 6/2016 | La et al. | |
| 2017/0229100 A1 * | 8/2017 | Chun | G06F 1/1647 |
| 2018/0039339 A1 * | 2/2018 | Henell | G06F 1/1681 |
| 2018/0039410 A1 | 2/2018 | Kim et al. | |
| 2018/0129250 A1 | 5/2018 | La et al. | |
| 2018/0260803 A1 * | 9/2018 | Seol | H04M 1/72412 |
| 2019/0028579 A1 | 1/2019 | Cho et al. | |

FOREIGN PATENT DOCUMENTS

| | | |
|---|---|---|
| KR | 10-2016-0055646 A | 5/2016 |
| KR | 10-2017-0082926 A | 7/2017 |

\* cited by examiner

ELECTRONIC DEVICE FOR CONTROLLING APPLICATION ACCORDING TO FOLDING ANGLE AND METHOD THEREOF

CROSS-REFERENCE TO RELATED APPLICATION(S)

This application is based on and claims priority under 35 U.S.C. § 119 to Korean Patent Application No. 10-2018-0123890, filed on Oct. 17, 2018, in the Korean Intellectual Property Office, the disclosure of which is incorporated by reference herein its entirety.

BACKGROUND

1. Field

The disclosure generally relates to an electronic device whose applications may be controlled according to a folding angle of the electronic device and a method thereof.

2. Description of Related Art

When an electronic device includes a foldable housing and a foldable display (or flexible display), the electronic device may be in a flat state or a folded state (e.g., a fully folded state). When the electronic device is in the unfolded state, the electronic device may provide a larger screen to the user via the unfolded display, and when the electronic device is in the folded state, the electronic device may be more portable for the user.

The above information is presented as background information only to assist with an understanding of the disclosure. No determination has been made, and no assertion is made, as to whether any of the above might be applicable as prior art with regard to the disclosure.

SUMMARY

Because the foldable display is arranged on one surface (e.g., the front surface) of the foldable housing, when the electronic device is in the fully folded state, the user must unfold the electronic device to see content displayed on the display. In this case, it may take time for the user to first unfold the electronic device and then enter user input to control the application displayed on the display. Alternatively, the electronic device may provide a sub-display arranged on an opposite surface (e.g., the rear surface) of the housing to allow the user to control the application, but the user may experience inconvenience due to limitation in size and visibility of the sub-display.

Aspects of the disclosure are to address at least the above-mentioned problems and/or disadvantages and to provide at least the advantages described below. Accordingly, an aspect of the disclosure is to provide a device where its applications may be controlled according to a folding angle of the device and a method thereof.

In accordance with an aspect of the disclosure, an electronic device may include a foldable housing including a first surface and a second surface opposite to the first surface, a first display arranged on the first surface and configured to be flexible, a second display arranged in at least a partial area of the second surface, and a processor arranged inside the foldable housing, wherein the processor may detect that the foldable housing is unfolded to a first angle from a fully folded state, display a first graphic user interface (GUI) associated with a first application on at least a partial area of the first display, detect that the foldable housing is unfolded to a second angle greater than the first angle, display a second GUI associated with a second application, and execute the second application when the foldable housing is folded back into the fully folded state.

In accordance with another aspect of the disclosure, a method of an electronic device may include detecting that the electronic device is unfolded to a first angle from a fully folded state, displaying a first graphic user interface (GUI) associated with a first application on at least a partial area of a first display of the electronic device, detecting that the electronic device is unfolded to a second angle greater than the first angle, displaying a second GUI associated with a second application, and executing the second application when the electronic device is folded back into the fully folded state.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In regard to the description of the drawings, the same or corresponding elements may be given the same reference numerals.

DETAILED DESCRIPTION

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present invention.

Figure 1:
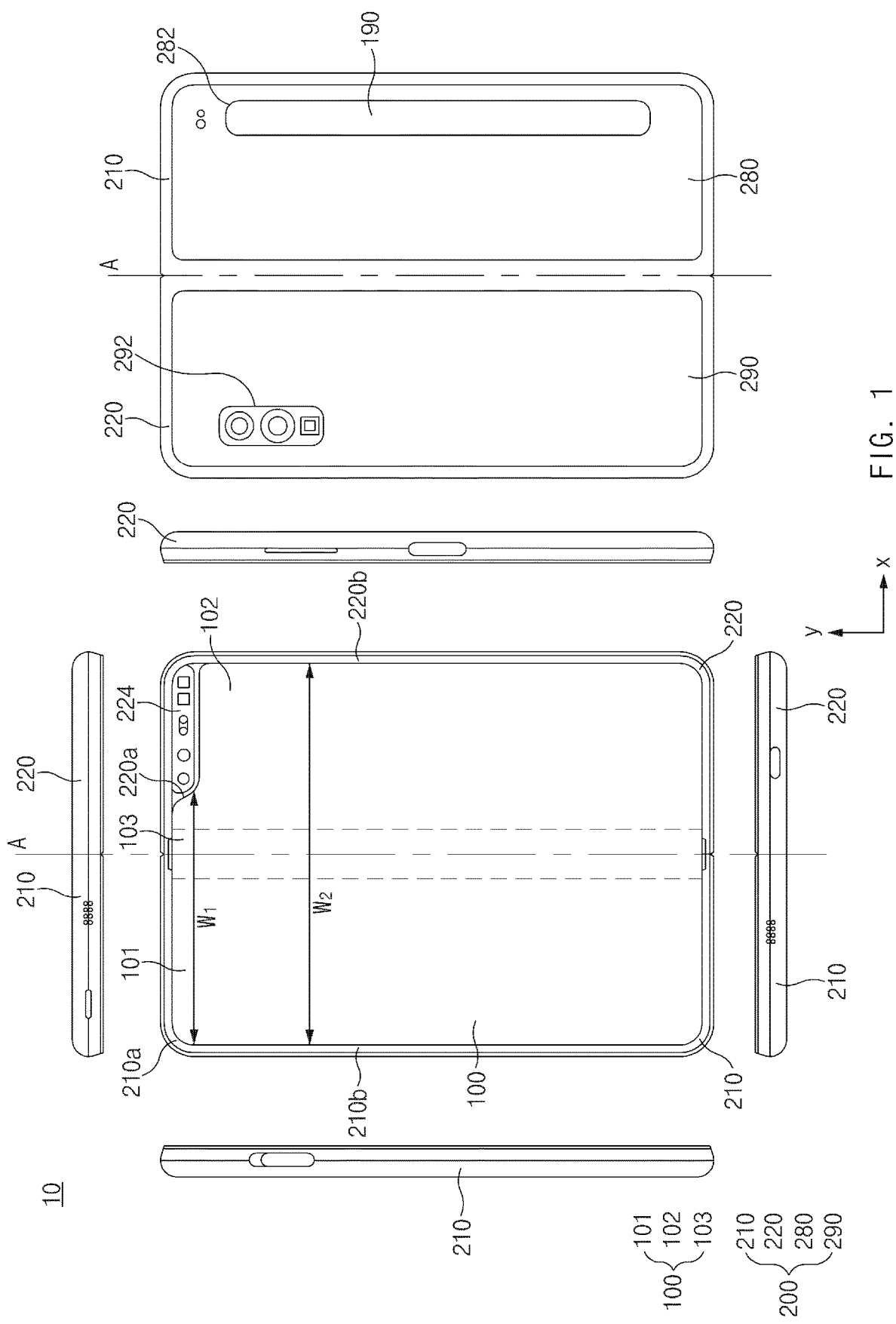
FIG. 1 is a view illustrating an unfolded state of an electronic device according to an embodiment.
Figure 2:
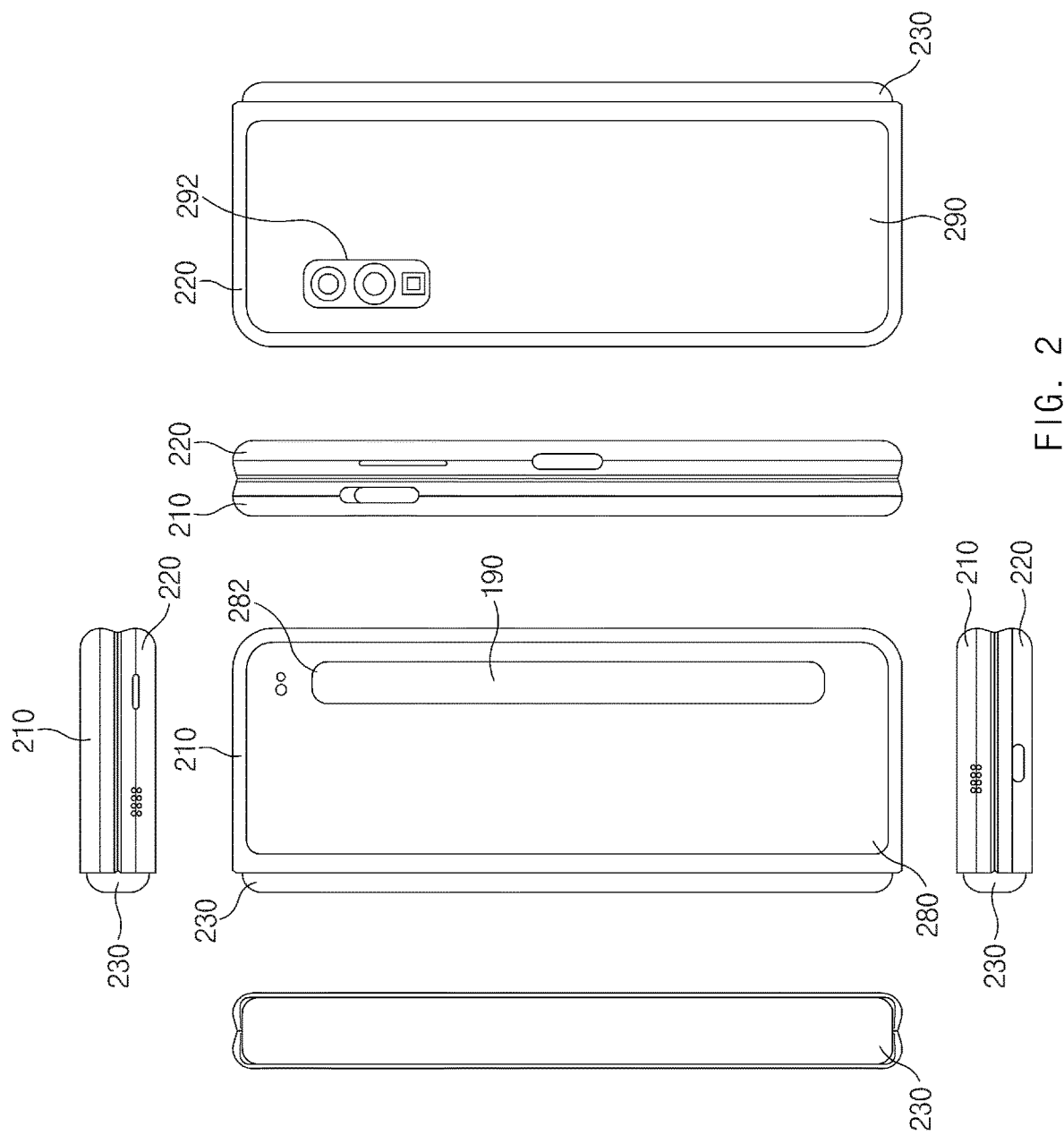
FIG. 2 is a view illustrating a folded state of the electronic device according to an embodiment.

FIG. 1 is a view illustrating an unfolded state of an electronic device 10 according to an embodiment. FIG. 2 is a view illustrating a folded state of the electronic device 10 according to an embodiment.

Referring to FIGS. 1 and 2, according to an embodiment, the electronic device 10 may include a foldable housing 200, a hinge cover 230 for covering a foldable portion of the foldable housing 200, and a flexible or foldable display 100 (hereinafter, may be abbreviated as a "display") arranged in a space formed by the foldable housing 200. In the instant disclosure, the surface on which the display 100 is arranged may be referred to as the first surface or the front surface of the electronic device 10. The opposite surface of the front surface may be referred to as the second surface or the rear surface of the electronic device 10. In addition, the surface surrounding the space between the front and rear surfaces may be referred to as the third surface or the side surface of the electronic device 10.

According to an embodiment, the foldable housing 200 may include a first housing structure 210, a second housing structure 220 including a sensor area 224, a first rear cover 280, and a second rear cover 290. The foldable housing 200 of the electronic device 10 is not limited to the shapes and couplings illustrated in FIGS. 1 and 2, but may be implemented in other shapes, combinations and/or couplings of parts. For example, according to another embodiment, the first housing structure 210 and the first rear cover 280 may be integrally formed, and the second housing structure 220 and the second rear cover 290 may be integrally formed.

In the illustrated embodiment, the first and second housing structures 210 and 220 may be arranged on left and right sides of a folding axis ("A" axis) and may be generally symmetrical with respect to the folding axis "A." As described below, the first and second housing structures 210 and 220 may form different angles depending on how the electronic device 10 is folded. In the illustrated embodiment, unlike the first housing structure 210, although the second housing structure 220 further includes the sensor area 224 in which various sensors are arranged. But aside from the sensor area 224, the first and second housing structures 210 and 220 may be mutually symmetrical.

In an embodiment, as illustrated in FIG. 1, the first and second housing structures 210 and 220 may together form a recess for receiving the display 100. In the illustrated embodiment, due to the sensor area 224, the recess may have two or more different widths in the direction perpendicular to the folding axis "A".

For example, the recess may have (1) a first width w1 between a first portion 210a of the first housing structure 210 parallel to the folding axis "A" and a first portion 220a of the second housing structure 220 formed at an edge of the sensor area 224 and (2) a second width w2 formed by a second portion 210b of the first housing structure 210 and a second portion 220b which does not correspond to the sensor area 224 of the second housing structure 220 and is parallel to the folding axis "A." In this case, the second width w2 may be longer than the first width w1. In other words, the first portion 210a of the first housing structure 210 and the first portion 220a of the second housing structure 220, which are mutually asymmetrical about the folding axis "A," may form the first width w1 of the recess. The second portion 210b of the first housing structure 210 and the second portion 220b of the second housing structure 220, which are mutually symmetrical about the folding axis "A," may form the second width w2 of the recess. Thus, the first and second portions 220a and 220b of the second housing structure 220 may have different distances from the folding axis "A." The width of the recess is not limited to the illustrated example. In various embodiments, the recess may have a plurality of widths as defined by the shape of the sensor area 224 or portions having asymmetrical shapes of the first and second housing structures 210 and 220.

In an embodiment, at least a portion of the first and second housing structures 210 and 220 may be made of a rigid metallic or non-metallic material to support the display 100.

In an embodiment, the sensor area 224 may be an area adjacent to one corner of the second housing structure 220. The arrangement, shape, and size of the sensor area 224 are not limited to the illustrated examples. For example, in another embodiment, the sensor area 224 may be provided at another corner of the second housing structure 220, or in an arbitrary area of the foldable housing 200. In an embodiment, components for performing various functions embedded in the electronic device 10 may be exposed to the front of the electronic device 10 through the sensor area 224 or at least one opening provided in the sensor area 224. In various embodiments, the components may include various types of sensors. For example, the sensor may include at least one of a front camera, a receiver, or a proximity sensor.

The first rear cover 280 is arranged at one side of the folding axis "A" on the rear surface of the electronic device 10 and may be, for example, enclosed at the periphery by the first housing structure 210. Similarly, the second rear cover 290 may be arranged at another side of the folding axis "A"

on the rear surface of the electronic device 10, and may be enclosed at the periphery by the second housing structure 220.

In the illustrated embodiment, the first and second rear covers 280 and 290 may have substantially symmetrical shapes about the folding axis "A." However, the first and second rear covers 280 and 290 do not necessarily have to be mutually symmetrical, and in another embodiment, the electronic device 10 may include the first and second rear covers 280 and 290 that have different, i.e. asymmetric, shapes. In another embodiment, the first rear cover 280 may be formed integrally with the first housing structure 210, and the second rear cover 290 may be formed integrally with the second housing structure 220.

In an embodiment, the first and second rear covers 280 and 290, and the first and second housing structures 210 and 220 may form a space in which various components (e.g., a printed circuit board or a battery) of the electronic device 10 are arranged. In an embodiment, one or more components may be arranged on the rear surface of the electronic device 10 or visually exposed. For example, at least a portion of a sub-display 190 may be visually exposed through a first rear area 282 of the first rear cover 280. In another embodiment, one or more components or sensors may be visually exposed through a second rear area 292 of the second rear cover 290. In various embodiments, the sensor may include a proximity sensor and/or a rear camera.

Referring to FIG. 2, the hinge cover 230 is arranged between the first and second housing structures 210 and 220 to cover internal components of the electronic device 10 (e.g., the hinge structure). In an embodiment, the hinge cover 230 may be covered by portions of the first and second housing structures 210 and 220 or exposed to an outside, depending on how the electronic device 10 is folded (i.e. whether the electronic device 10 is in the unfolded or folded state).

For example, as illustrated in FIG. 1, when the electronic device 10 is in the unfolded state, the hinge cover 230 is covered by the first and second housing structures 210 and 220. But in another example, as illustrated in FIG. 2, when the electronic device 10 is in the folded state (e.g. the fully folded state), the hinge cover 230 may be exposed between the first and second housing structures 210 and 220. In yet another state, when the first and second housing structures 210 and 220 are folded at a particular angle in an intermediate state, the hinge cover 230 may be partially exposed between the first and second housing structures 210 and 220. In this case, the exposed area may be less than in the fully folded state. In an embodiment, the hinge cover 230 may include a curved surface.

The display 100 may be arranged in a space formed by the foldable housing 200. For example, the display 100 may be placed in the recess formed by the foldable housing 200 and may constitute most of the front surface of the electronic device 10.

Thus, the front surface of the electronic device 10 may include the display 100, a partial area of the first housing structure 210 adjacent to the display 100, and a partial area of the second housing structure 220. In addition, the rear surface of the electronic device 10 may include the first rear cover 280, a partial area of the first housing structure 210 adjacent to the first rear cover 280, the second rear cover 290, and a partial area of the second housing structure 220 adjacent to the second rear cover 290.

The display 100 may refer to a display in which at least a partial area may be deformed into planar or curved surfaces. In an embodiment, the display 100 may include a folding area 103, a first area 101 positioned at one side (the left side of the folding area 103 shown in FIG. 1) with respect to the folding area 103, and a second area 102 positioned at an opposite side (the right side of the folding area 103 shown in FIG. 1).

The area division of the display 100 shown in FIG. 1 is exemplary. The display may be divided into a plurality of areas (e.g., four or more areas) depending on how the display is manufactured. For example, in the embodiment shown in FIG. 1, the area of the display 100 is divided by the folding area 103 extending in parallel to the y-axis or the folding axis "A." In another embodiment, the area of the display 100 may be divided based on another folding area (e.g., a folding area parallel to the x-axis) or another folding axis (e.g., a folding axis parallel to the x-axis).

The first and second areas 101 and 102 may be generally symmetrical to each other about the folding area 103. However, unlike the first area 101, the second area 102 may include a notch cut due to the presence of the sensor area 224, but in other areas, the second area 102 may be symmetrical to the first area 101. In other words, the first and second areas 101 and 102 may include portions that are mutually symmetrical and portions that are mutually asymmetrical.

Hereinafter, the operations of the first and second housing structures 210 and 220 and each area of the display 100 in various folding states will be described.

In an embodiment, when the electronic device 10 is in the flat or unfolded state (e.g., FIG. 1), the first and second housing structures 210 and 220 may be at an angle of 180 degrees with respect to each other and may be arranged to be facing in the same direction. The surfaces of the first and second areas 101 and 102 of the display 100 may be also at 180 degrees with each other and also may be facing the same direction (e.g., the front direction of the electronic device facing the user). The folding area 103 may be co-planar with the first and second areas 101 and 102.

In an embodiment, when the electronic device 10 is in the folded state (e.g., FIG. 2), the first and second housing structures 210 and 220 are arranged to face each other. The surfaces of the first and second areas 101 and 102 of the display 100 may form a relatively acute angle (e.g., between 0 and 10 degrees) and may face each other. The folding area 103 may form a curved surface at least partially having a specified curvature.

In an embodiment, when the electronic device 10 is in an intermediate state (e.g., a folded state between those shown in FIG. 1 and FIG. 2), the first and second housing structures 210 and 220 may be arranged at a certain angle with respect to each other. The surfaces of the first and second areas 101 and 102 of the display 100 may be at the certain angle, which is larger than that in the folded state and smaller than that in the unfolded state. The folding area 103 may formed a curved surface at least partially having a specified curvature, and in this case, the curvature may be smaller than that in the folded state.

Figure 3:
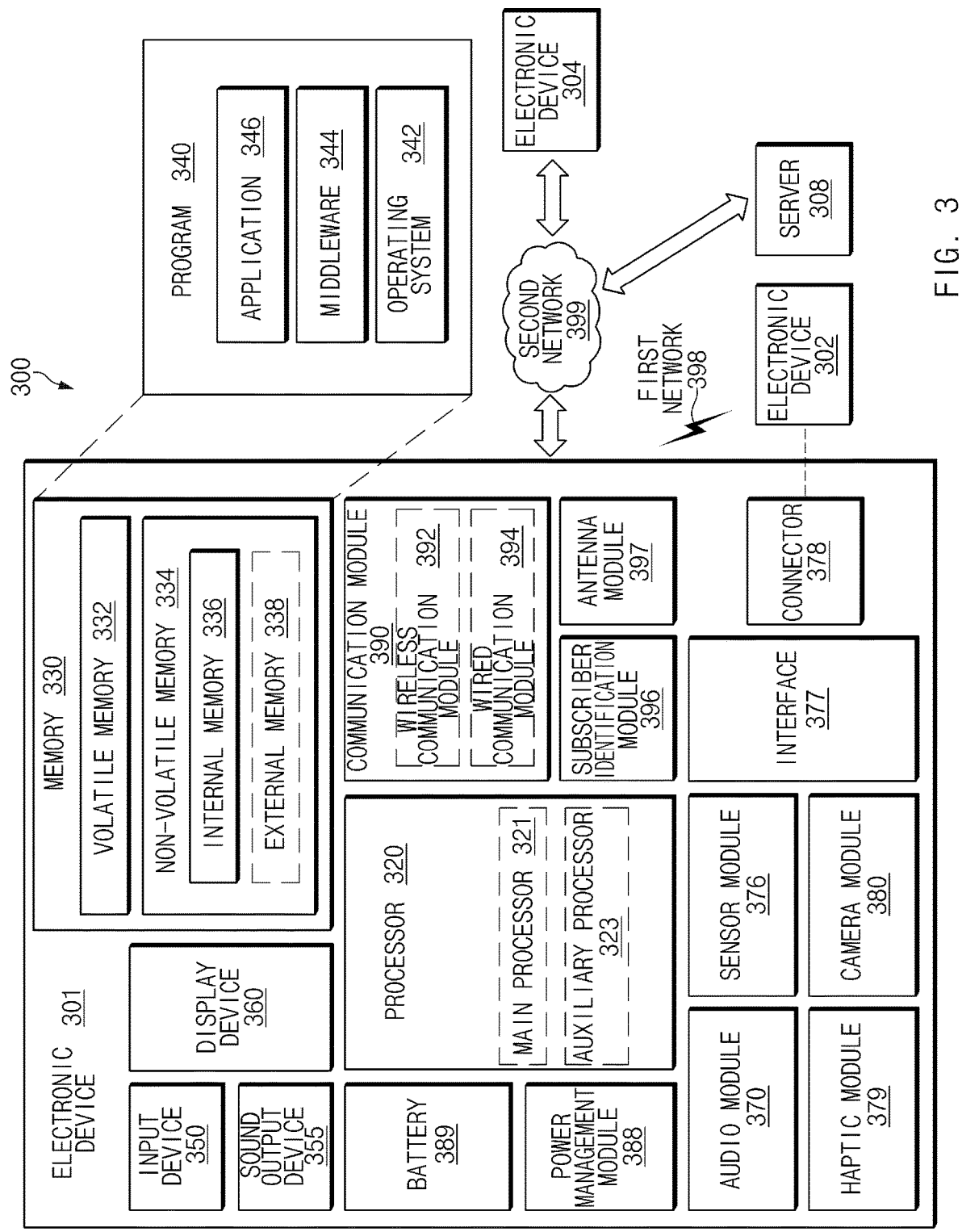
FIG. 3 is a block diagram illustrating an electronic device in a network environment according to certain embodiments.

FIG. 3 is a block diagram illustrating a network environment including the electronic device 10 of FIG. 1 and at least one component included in the electronic device 10.

FIG. 3 is a block diagram illustrating an electronic device 301 in a network environment 300 according to various embodiments. Referring to FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In some embodiments, at least one (e.g., the display device 360 or the camera module 380) of the components may be omitted from the electronic device 301, or one or more other components may be added in the electronic device 301. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320, and may perform various data processing or computation. According to one embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by other component (e.g., the processor 320) of the electronic device 301, from the outside (e.g., a user) of the electronic device 301. The input device 350 may include, for example, a microphone, a mouse, a keyboard, or a digital pen (e.g., a stylus pen).

The sound output device 355 may output sound signals to the outside of the electronic device 301. The sound output device 355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to an embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to an embodiment, the audio module 370 may obtain the sound via the input device 350, or output the sound via the sound output device 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., PCB). According to an embodiment, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

Figure 4:
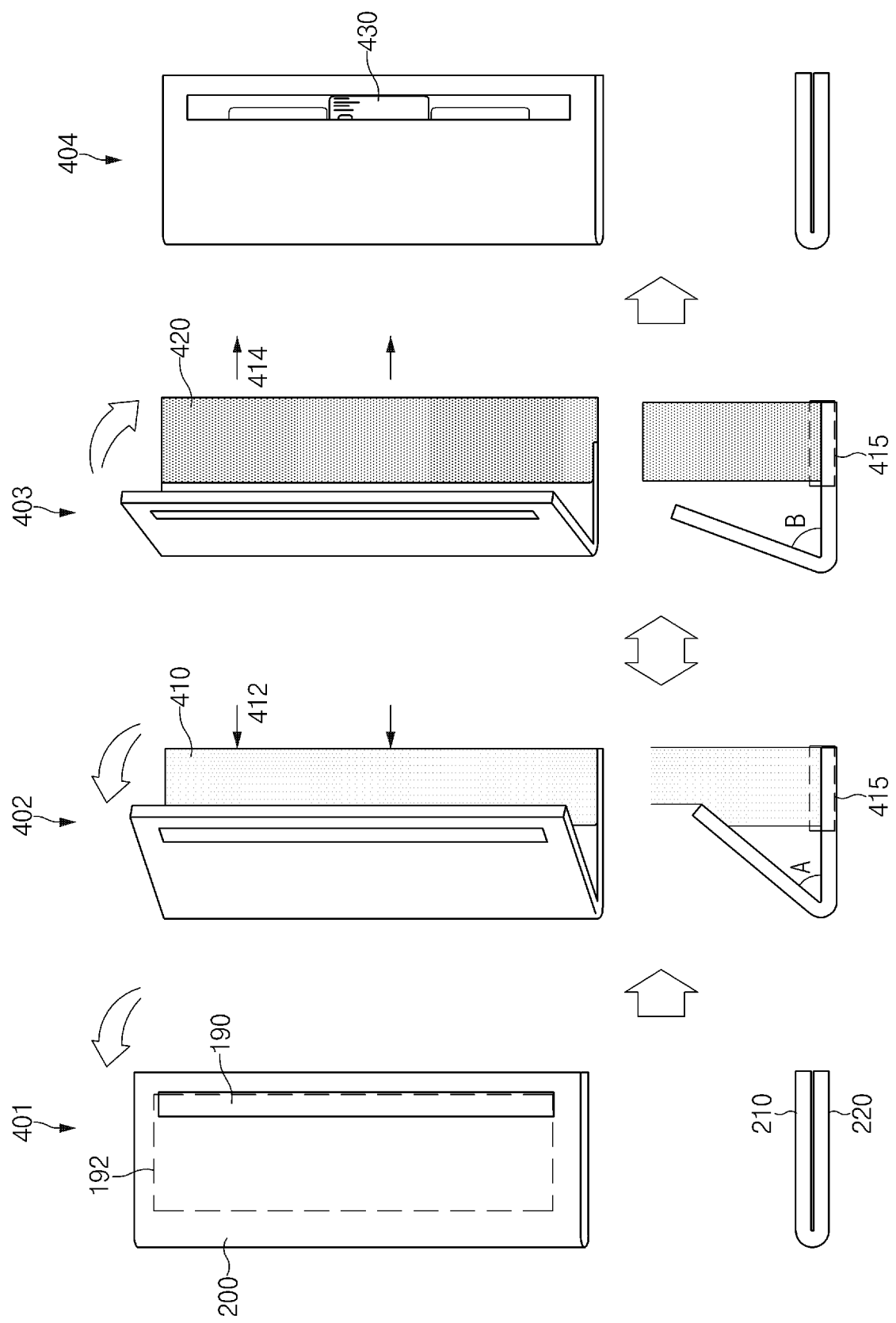
FIG. 4 is a view illustrating an operation of an electronic device that scrolls a graphical user interface (GUI) corresponding to an application according to an embodiment.

FIG. 4 is a view illustrating the operation of an electronic device (e.g., reference numeral 10 of FIG. 1) that scrolls a graphical user interface (GUI) corresponding to an application according to an embodiment.

Referring to FIG. 4, in operation 401, the foldable housing 200 of the electronic device 10 may be in a fully folded state. In the fully folded state, the angle formed by the first and second housing structures (e.g., reference numerals 210 and 220 of FIG. 1) may be substantially zero degree (i.e. less than 10 degrees). In the fully folded state, the display (e.g., reference numeral 100 of FIG. 1) may not be visible to the user. In this case, the second housing structure forms the upper surface of the electronic device, and the sub-display 190 may be visible to the user. The size of the sub-display 190 is not limited to the example illustrated in FIG. 4. For example, according to another embodiment, the size of the sub-display 190 may be substantially the same as or similar to that of the second housing structure (e.g., illustrated in FIG. 4 as reference numeral 192).

In operation 402, the electronic device 10 may detect that the foldable housing 200 is unfolded to a first angle 'A' from the fully folded state. In response to sensing that the foldable housing 200 is unfolded at the first angle 'A,' the electronic device 10 may display a first GUI 410 corresponding to a first application on at least a partial area of the display 100.

According to an embodiment, the GUI (e.g., the first GUI 410 or the second GUI 420) may include user interface (UI) items corresponding to various functions of the first application. According to an embodiment, the GUI may be referred to as an edge panel. Examples of the functions represented by the GUI will be described later wither reference to FIGS. 10A to 10D.

When the angle (e.g., the first angle 'A' or the second angle 'B') at which the foldable housing 200 is unfolded is less than 90 degrees, because the size of the display 100 seen by the user is limited, the GUI may be displayed in the edge area (e.g., an area 415) of the display 100 such that the GUI is seen by the user even though the foldable housing 200 is not fully unfolded. For example, the first GUI 410 may scroll from the right to the left of the display 100 (e.g., as shown by reference numeral 412).

In operation 403, the electronic device 10 may detect that the foldable housing 200 is unfolded to the second angle 'B' greater than the first angle 'A.' In response to detecting that the foldable housing 200 is unfolded to the second angle 'B,' the electronic device 10 may display the second GUI 420 corresponding to a second application in at least a partial area (e.g., shown by the reference numeral 415) of the display 100. The second application may refer to a different application from the first application. According to an embodiment, the electronic device 10 may control the first GUI 410 to disappear in the right direction (e.g., shown by the reference numeral 414) and the second GUI 420 to scroll in the right direction.

According to an embodiment, the electronic device 10 may operate from operation 403 to operation 402. For example, when the foldable housing 200 is folded from the second angle 'B' to the first angle 'A' while the second GUI 420 is being displayed, the electronic device 10 may scroll the second GUI 420 off the display to show the first GUI 410.

In operation 404, the electronic device 10 may detect that the foldable housing 200 is folded back into the fully folded state. In response to sensing that the foldable housing 200 is folded in the fully folded state, the electronic device 10 may execute the second application. According to an embodiment, the electronic device 10 may display information 430 associated with the second application on the sub-display 190. For example, as illustrated in FIG. 4, when the second application is a payment application, the electronic device 10 may display at least a portion of the image of a card registered in the payment application on the sub-display 190.

In the embodiments described below, although the size of the sub-display 190 is described as encompassing a partial area (e.g., the first rear area 282 of FIG. 1) of the first rear cover 280, even when the size of the sub-display 190 may be substantially the same as or similar to that of the second housing structure 220, the same principle may be applied.

FIGS. 5A to 5D are views illustrating the operation of executing an application based on user input and the folding state of the foldable housing according to certain embodiments.

In order to prevent a GUI (e.g., the second GUI 420 of FIG. 4) from being scrolled to another GUI (e.g., the first GUI 410 if FIG. 4) while the foldable housing 200 is being folded into the fully folded state, the electronic device 10 may execute an application corresponding to the GUI (e.g., the second GUI 420 of FIG. 4) only when a specified condition is met even while the foldable housing 200 is being folded into the fully folded state. For example, the electronic device 10 may execute the second application when the foldable housing 200 is folded at a specified threshold speed or more, when the foldable housing 200 is folded substantially simultaneously while a user input being received, or when the foldable housing 200 is folded after the user input is received.

Figure 5A:
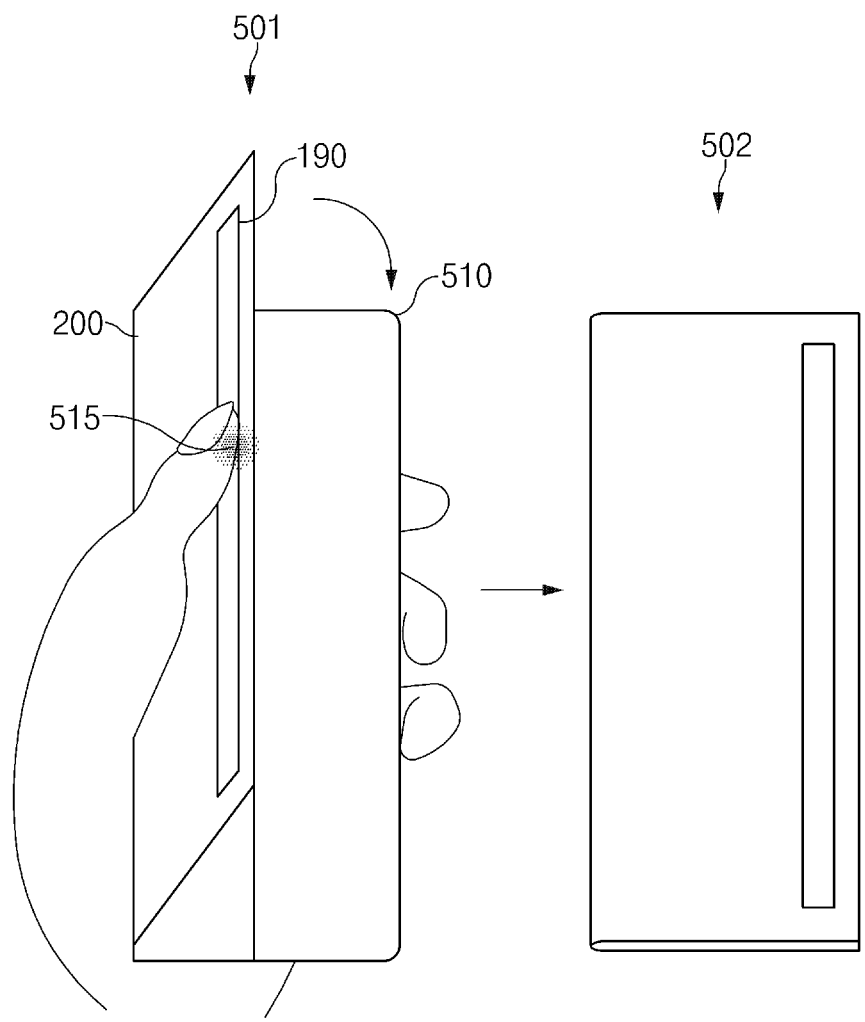
FIG. 5A is a view illustrating an example of executing an application based on a user input and a folding state of a foldable housing.

Referring to FIG. 5A, in operation 501, the electronic device 10 may receive a user input 515 of touching at least a partial area of the sub-display 190 while a GUI 510 (e.g., the first or second GUI 410 or 420 of FIG. 4) is displayed. In operation 502, the electronic device 10 may detect that the foldable housing 200 is folded into the fully folded state while the user input 515 is received or after the user input 515 is received. When the foldable housing 200 is folded in a fully folded state, the electronic device 10 may execute an application corresponding to the GUI 510.

Figure 5B:
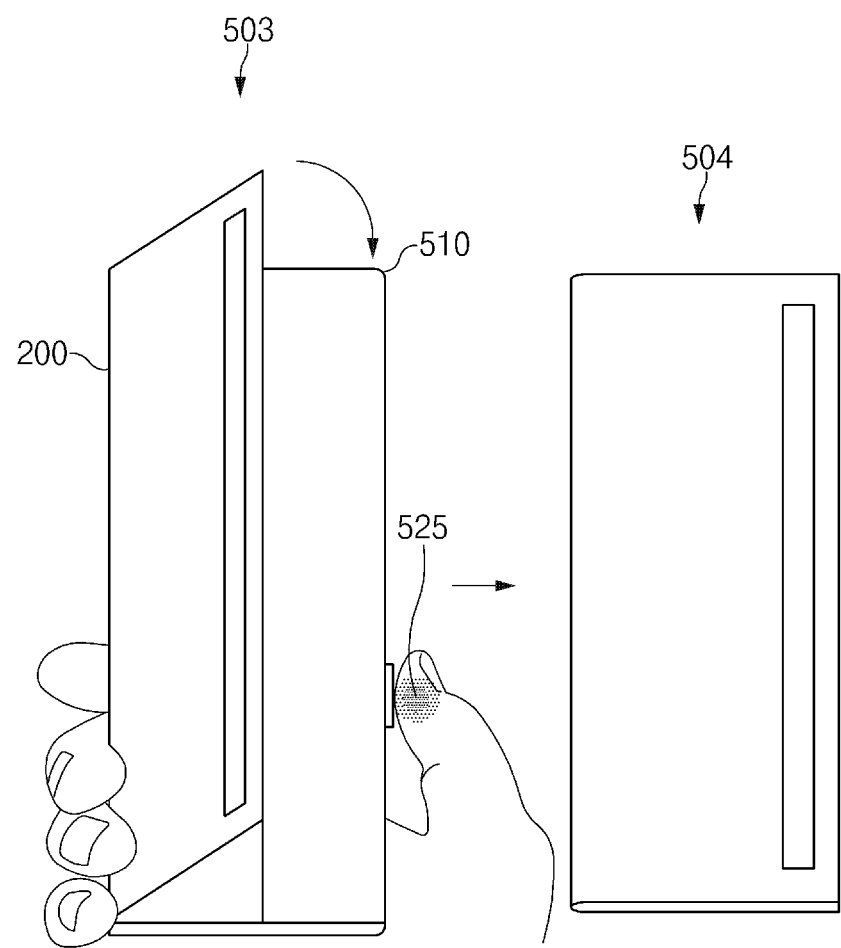
FIG. 5B is a view illustrating another example of executing an application based on a user input and a folding state of a foldable housing.

Referring to FIG. 5B, in operation 503, the electronic device 10 may receive a user input 525 on a fingerprint recognition sensor while the GUI 510 is displayed. According to an embodiment, the fingerprint recognition sensor may be arranged in a portion of an outer region of the electronic device 10. For example, as illustrated in FIG. 5B, the fingerprint recognition sensor may be arranged on a side surface of the electronic device 10, and such as a partial area of the first or second housing structure (e.g., reference numeral 210 or 220 of FIG. 1). In operation 504, the electronic device 10 may detect that the foldable housing 200 is folded into the fully folded state while the user input 525 is received or after the user input 525 is received. When the foldable housing 200 is folded into the fully folded state, the electronic device 10 may execute an application corresponding to the GUI 510.

Figure 5C:
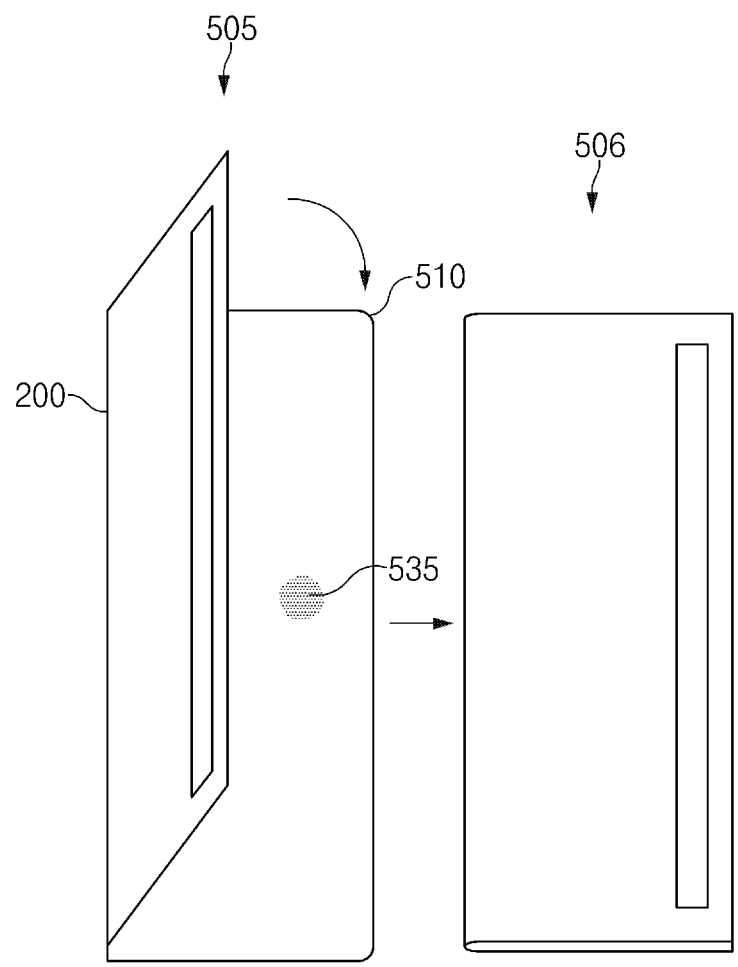
FIG. 5C is a view illustrating yet another example of executing an application based on a user input and a folding state of a foldable housing.

Referring to FIG. 5C, in operation 505, the electronic device 10 may receive a user input 535 of touching at least a partial area of the display 100 while the GUI 510 is displayed. In operation 506, the electronic device 10 may detect that the foldable housing 200 is folded into the fully folded state while the user input 535 is received or after the user input 535 is received. When the foldable housing 200 is folded into the fully folded state, the electronic device 10 may execute an application corresponding to the GUI 510.

Figure 5D:
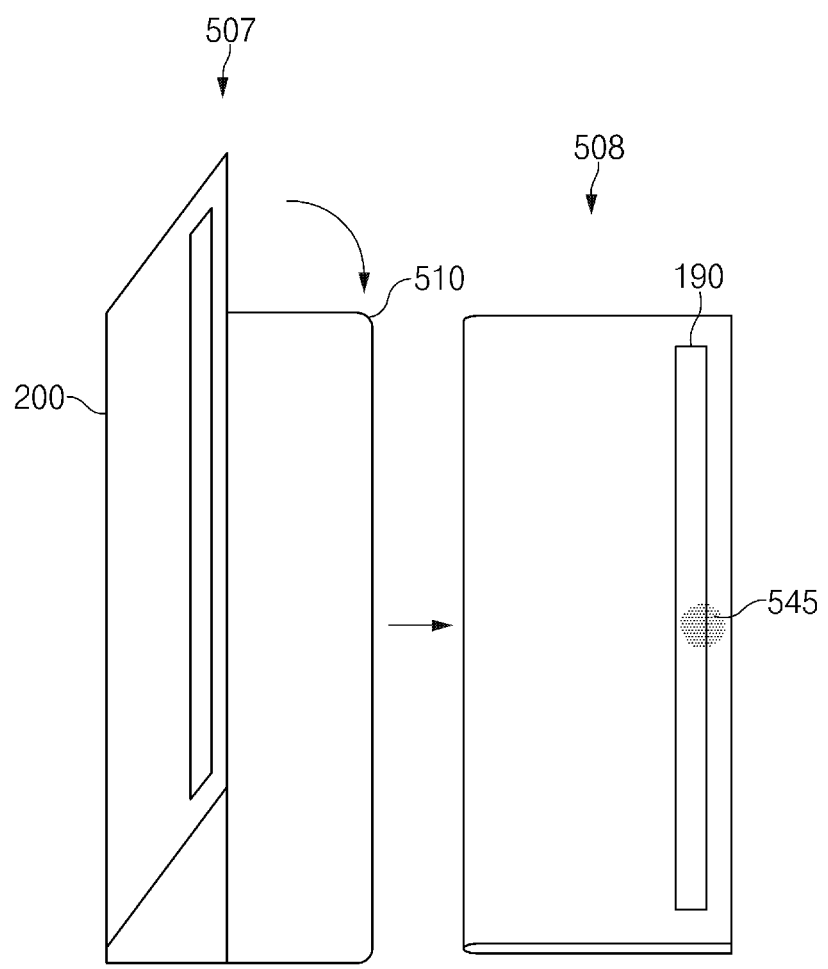
FIG. 5D is a view illustrating still another example of executing an application based on a user input and a folding state of a foldable housing.

Referring to FIG. 5D, in operation 507, the electronic device 10 may detect that the foldable housing 200 is folded into the fully folded state without any additional user inputs while the GUI 510 is displayed. According to an embodiment, the electronic device 10 may detect that the foldable housing 200 is folded at a specified threshold speed or more.

According to an embodiment, after operation 507, the electronic device 10 may execute an application when an additional user input is received after the foldable housing 200 is folded into the fully folded state. For example, in operation 508, the electronic device 10 may receive a user input 545 of touching at least a partial area of the sub-display 190. The electronic device 10 may execute an application corresponding to the GUI 510 after the user input 545 is received.

Figure 6:
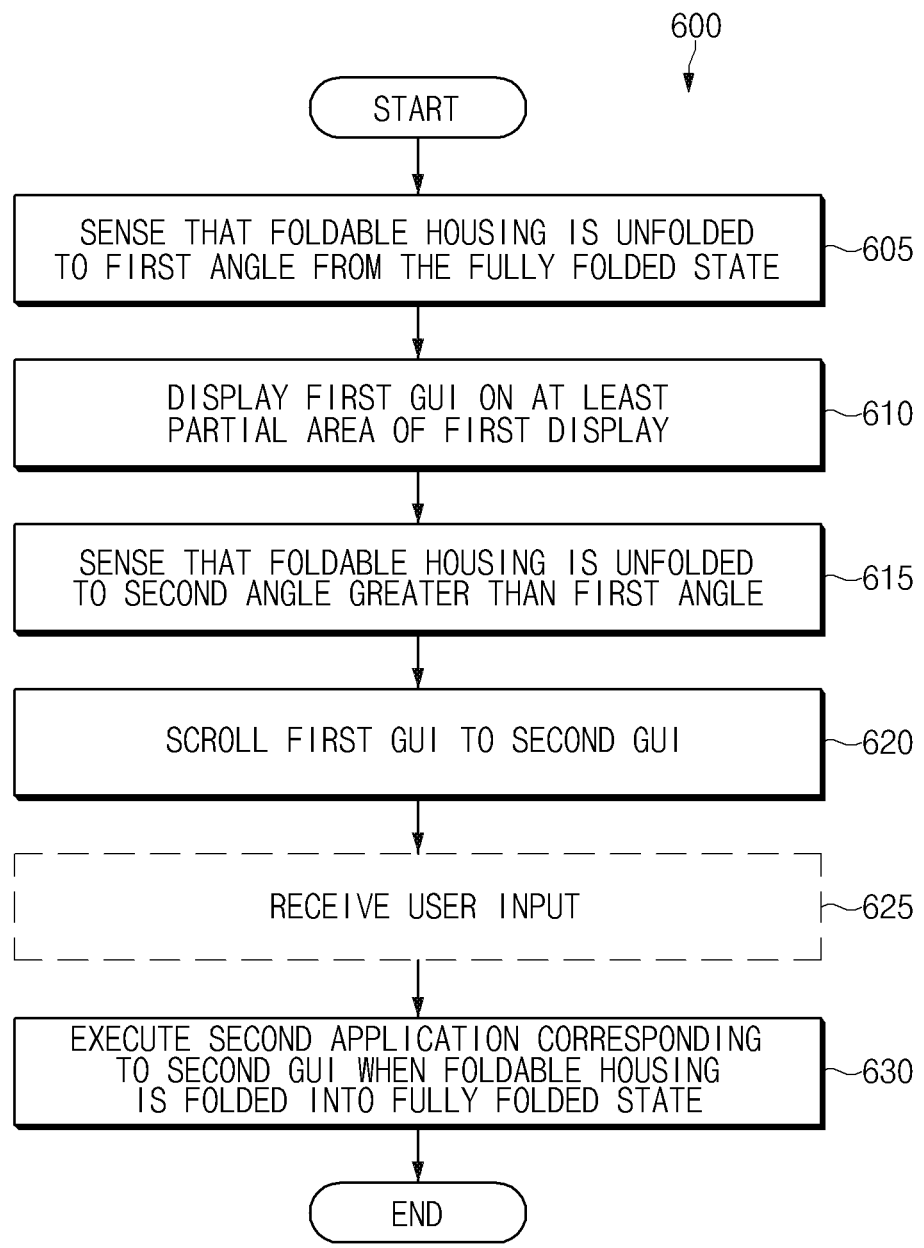
FIG. 6 is a flowchart illustrating an operation of an electronic device that scrolls a GUI corresponding to an application according to an embodiment.

FIG. 6 is a flowchart 600 illustrating an operation of the electronic device 10 that scrolls a GUI corresponding to an application according to an embodiment. In the following description, operations of FIG. 6 or other flowcharts described herein may be performed by the electronic device 10 or by components (e.g., the processor 320 of FIG. 3) of the electronic device 10. The processor 320 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

Referring to FIG. 6, in operation 605, the electronic device 10 may detect that the foldable housing (e.g., reference numeral 200 of FIG. 1) is unfolded to a first angle from the fully folded state.

In operation 610, the electronic device 10 may display a first GUI (e.g., reference numeral 410 of FIG. 4) on at least a partial area (e.g., reference numeral 415 of FIG. 4) of a first display (e.g., the display 100 of FIG. 1).

In operation 615, the electronic device 10 may detect that the foldable housing is unfolded to a second angle greater than the first angle.

In operation 620, the electronic device 10 may scroll the first GUI off the display 100 to display the second GUI (e.g., reference numeral 420 of FIG. 4). According to an embodiment, the first GUI may represent functions of a first application, and the second GUI may represent functions of a second application which is different from the first application.

In operation 625, the electronic device 10 may receive a user input. For example, the user input may include at least one of a touch input received on at least a partial area of the second display (e.g., the sub-display 190 of FIG. 4), a touch input received on at least a partial area of the first display, and a user input detected on the fingerprint recognition sensor. According to an embodiment, the electronic device 10 may omit operation 625 and proceed to operation 630.

In operation 630, when the foldable housing is folded into the fully folded state, the electronic device 10 may execute the second application corresponding to the second GUI.

Figure 7:
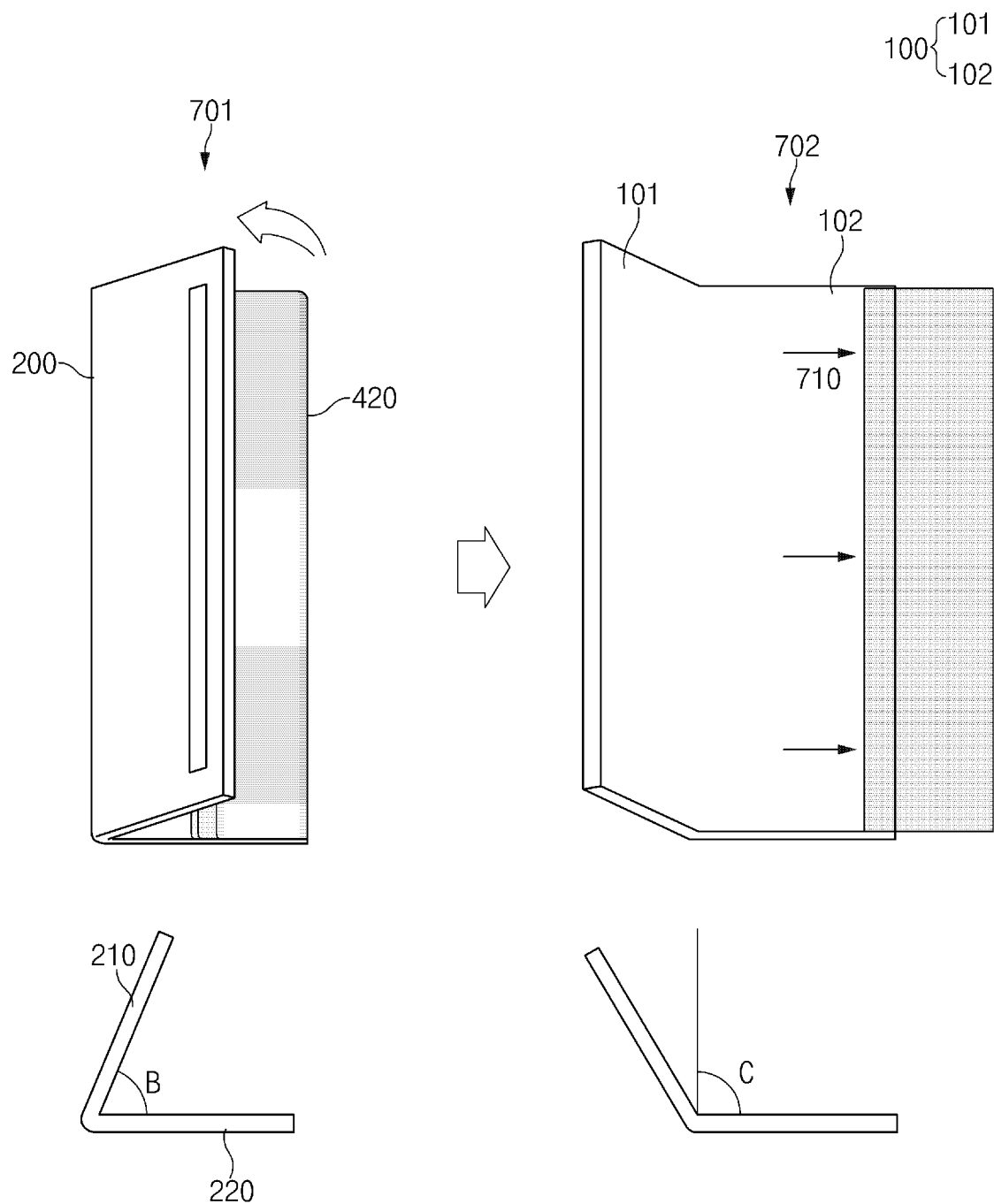
FIG. 7 is a view illustrating an operation of providing an effect that a GUI disappears off a display according to an embodiment.

FIG. 7 is a view illustrating an operation of providing an effect that the GUI 420 disappears off the display 100 according to an embodiment.

Referring to FIG. 7, in operation 701, in response to sensing that the foldable housing 200 is unfolded to the second angle 'B', the electronic device 10 may display the second GUI 420 on at least a partial area of the display 100.

In operation 702, the electronic device 10 may detect that the foldable housing 200 is unfolded to more than a specified threshold angle 'C' (e.g., 90 degrees). When the foldable housing 200 is unfolded to more than the specified threshold angle 'C,' because the first area 101 of the display 100 as well as the second area 102 may be seen by the user, the electronic device 10 may provide an effect that the second GUI 420 disappears off the display 100 and may display an execution screen of the second application on the display 100. For example, the electronic device 10 may control the second GUI 420 to disappear in the right direction (e.g., reference numeral 710).

Figure 8:
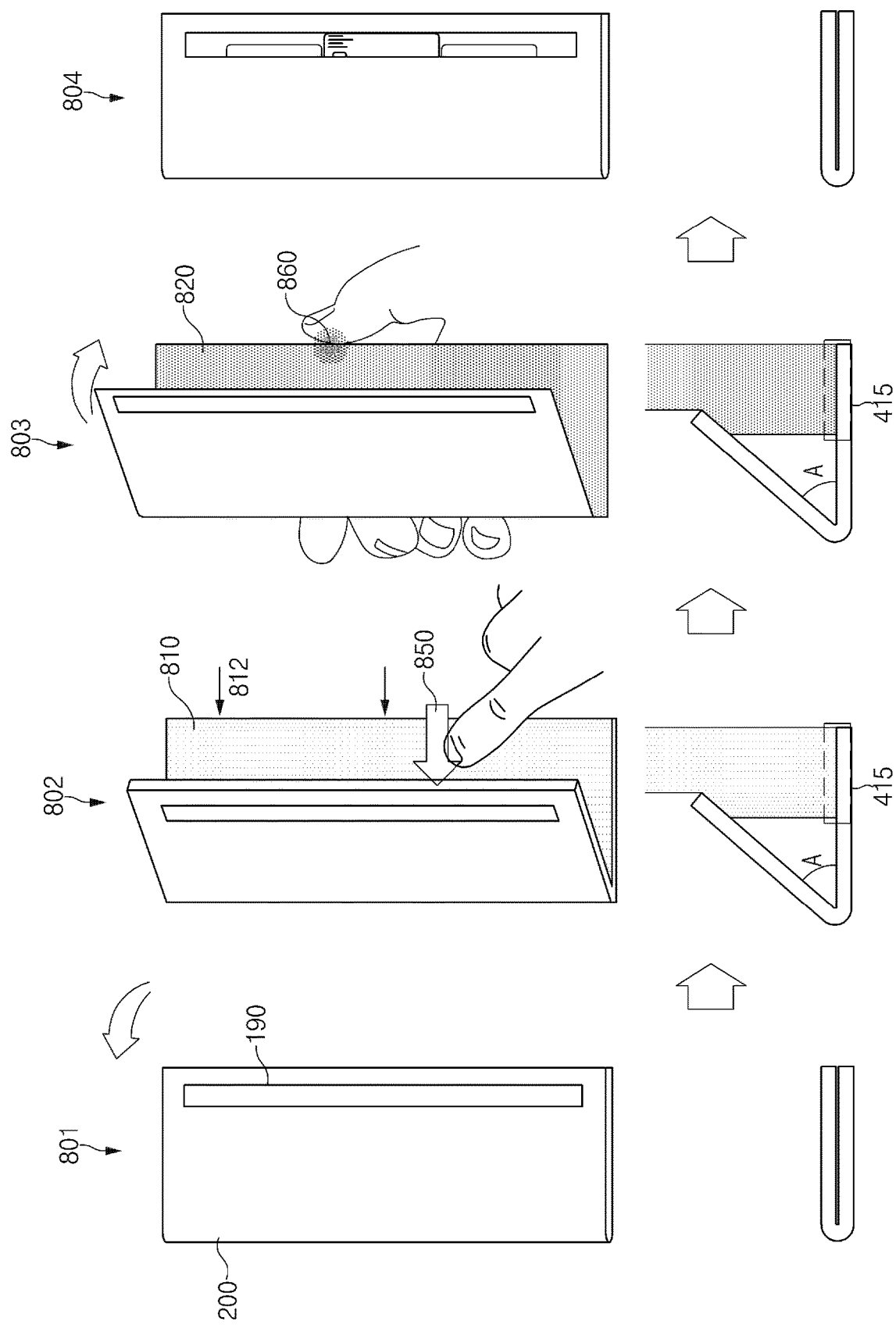
FIG. 8 is a view illustrating an operation of an electronic device that scrolls a GUI corresponding to an application based on a swipe input according to an embodiment.

FIG. 8 is a view illustrating an operation of the electronic device 10 that scrolls a GUI corresponding to an application based on a swipe input 850 according to an embodiment.

The electronic device 10 may scroll a first GUI 810 to a second GUI 820 corresponding to the swipe input 850 received on the first GUI 810 in addition to scrolling GUIs based on a folding angle of the foldable housing 200.

Referring to FIG. 8, in operation 801, the foldable housing 200 of the electronic device 10 may be in the fully folded state. When the foldable housing 200 is unfolded to the first angle 'A' from the fully folded state, the electronic device 10 may display the first GUI (e.g., reference numeral 410 of FIG. 4) 810 corresponding to the first application on at least a partial area (e.g., reference numeral 415) of the display 100.

In operation 802, the electronic device 10 may receive the swipe input 850 on the first GUI 810 while the foldable housing 200 is maintained at the first angle 'A.' According to an embodiment, the electronic device 10 may receive another type of a user input on the first GUI 810 in addition to the swipe input 850. For example, another type of a user input may include at least one of a tap, a double tap, a press, a deep press, a pan, a flick, a drag, a pinch, or a rotate. In response to receiving the swipe input 850, the electronic device 10 may scroll the first GUI 810 to the second GUI 820 corresponding to the second application in a direction (e.g., reference numeral 812) corresponding to the swipe input 850.

In operation 803, the electronic device 10 may receive a user input 860 while the second GUI 820 is displayed. Although the user input 860 detected on the fingerprint recognition sensor is illustrated in FIG. 8, it is not so limited. For example, the user input 860 may be at least one of a touch input received on the sub-display 190 or a touch input received on the second GUI 820.

In operation 804, the electronic device 10 may detect that the foldable housing 200 is folded into the fully folded state. When the foldable housing 200 is folded in the fully folded state, the electronic device 10 may execute the second application.

Figure 9:
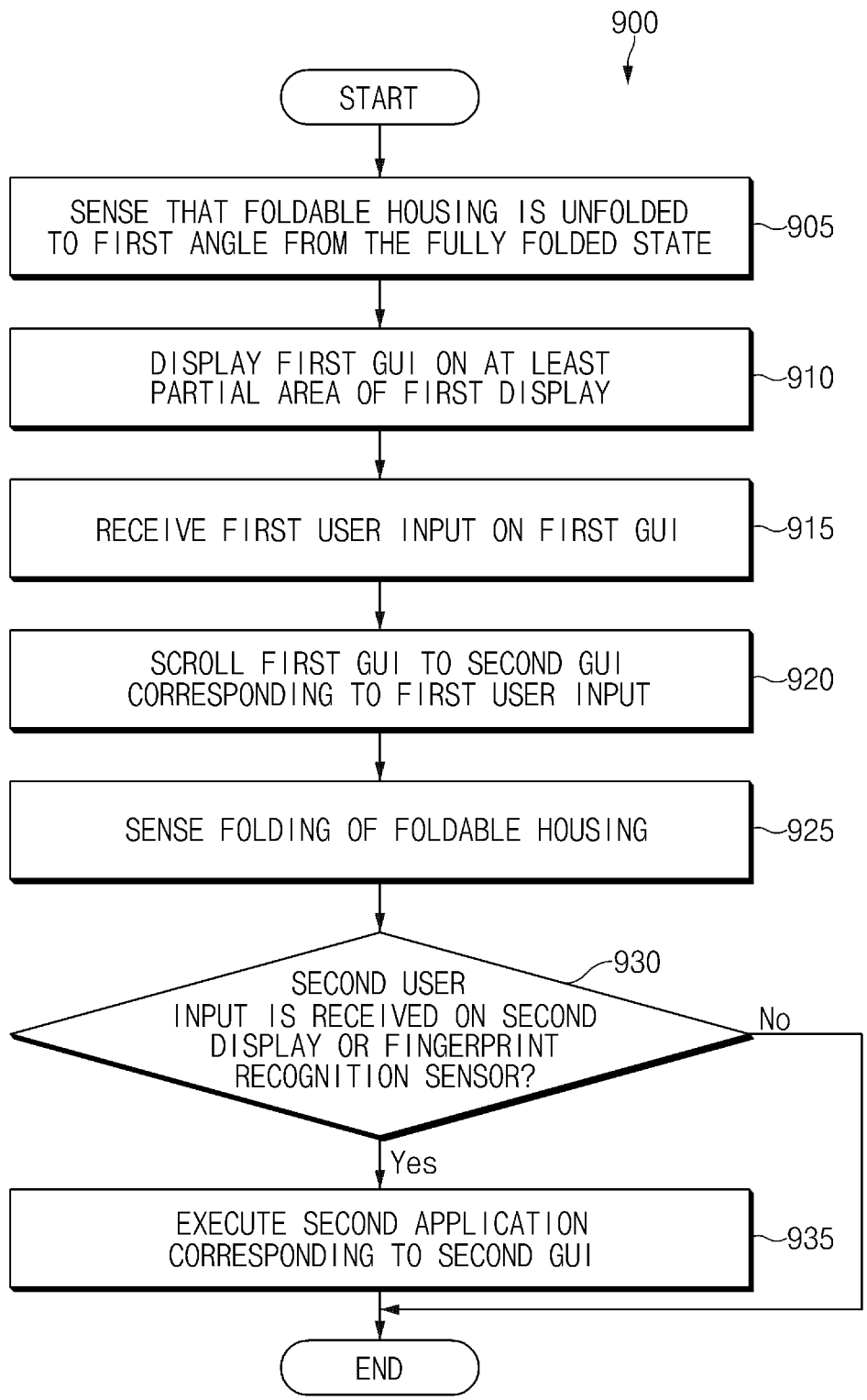
FIG. 9 is a flowchart illustrating an operation of an electronic device that scrolls a GUI corresponding to an application based on a swipe input according to an embodiment.

FIG. 9 is a flowchart 900 illustrating an operation of the electronic device 10 that scrolls a GUI corresponding to an application based on a swipe input according to an embodiment. The operations illustrated in FIG. 9 may be performed after operation 630 illustrated in FIG. 6, or may be performed independently of the flowchart 600.

Referring to FIG. 9, in operation 905, the electronic device 10 may detect that the foldable housing (e.g., reference numeral 200 of FIG. 1) is unfolded to a first angle from a fully folded state.

In operation 910, the electronic device 10 may display a first GUI (e.g., reference numeral 810 of FIG. 8) on at least a partial area of a first display (e.g., the display 100 of FIG. 1).

In operation 915, the electronic device 10 may receive a first user input on the first GUI. For example, the first user input may include at least one of a tap, a double tap, a press, a deep press, a pan, a swipe, a flick, a drag, a pinch, or a rotate.

In operation 920, the electronic device 10 may scroll the first GUI to a second GUI (e.g., reference numeral 820 of FIG. 8) corresponding to the first user input.

In operation 925, the electronic device 10 may detect that the foldable housing is folded.

In operation 930, the electronic device 10 may determine whether the second user input is received on the second display (e.g., the sub-display 190 of FIG. 8) or on a fingerprint recognition sensor. When the second user input is not received, the electronic device 10 may terminate the algorithm. When the second user input is received, in operation 935, the electronic device 10 may execute the second application corresponding to the second GUI.

According to an embodiment, the electronic device 10 may perform operation 925 after performing operation 930. For example, the electronic device 10 may detect that the foldable housing is folded after the second user input is received. In this case, when the foldable housing is folded into the fully folded state, the electronic device 10 may execute the second application.

FIGS. 10A to 10D are views illustrating examples of the second application and the second GUI described above (e.g., reference numeral 410 of FIG. 4 or reference numeral 820 of FIG. 8), according to certain embodiments.

Figure 10A:
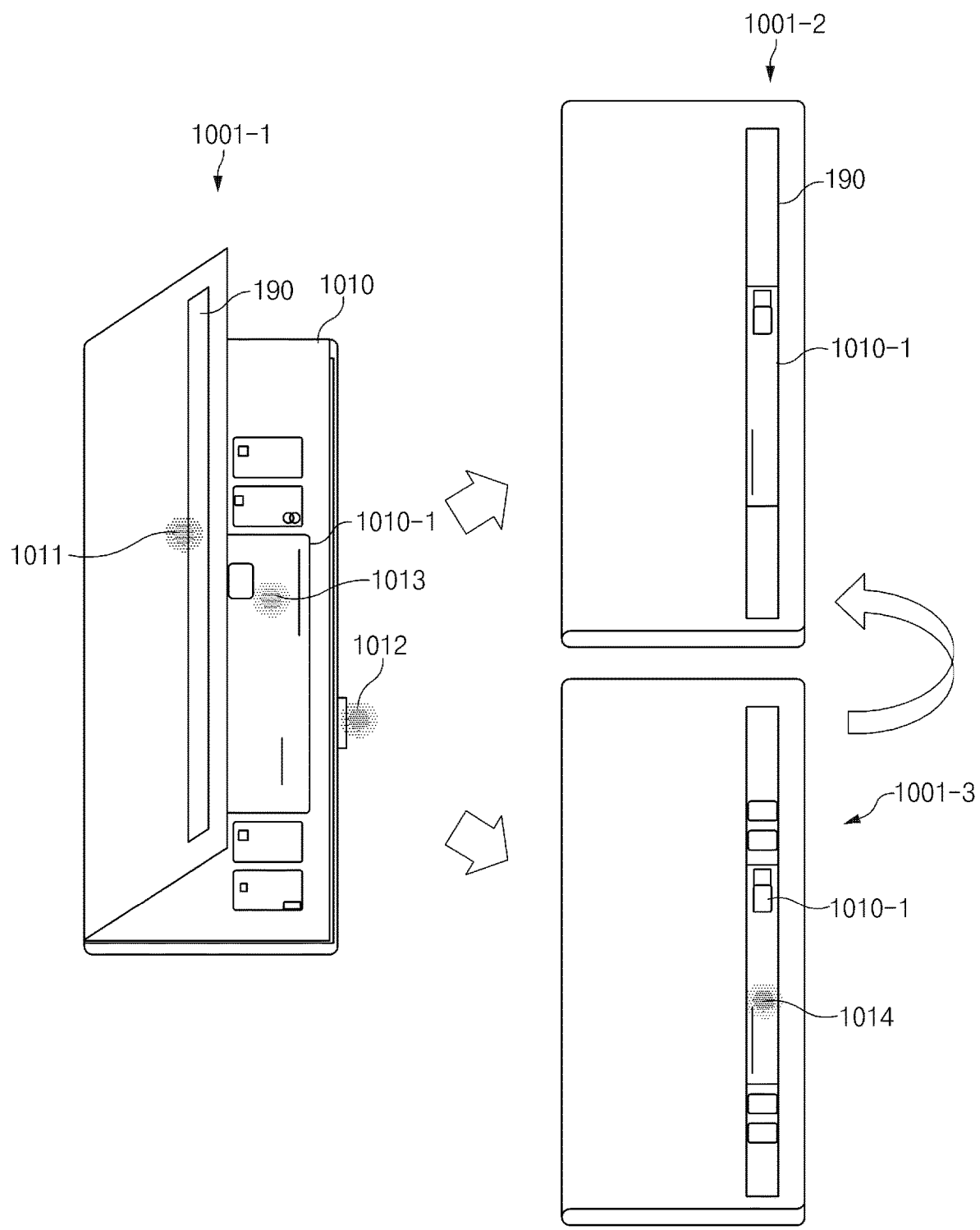
FIG. 10A is a view illustrating an operation for executing a payment application according to an embodiment.

FIG. 10A is a view illustrating an operation for executing a payment application. Referring to FIG. 10A, in operation 1001-1, the electronic device 10 may display, on at least a partial area (e.g., reference numeral 415 of FIG. 4) of the display 100, a GUI 1010 for controlling a payment application (e.g., Samsung Pay™) based on a folding angle of the foldable housing (e.g., reference numeral 200 of FIG. 1) or a user input (e.g., the swipe input 850 of FIG. 8). According to an embodiment, the GUI 1010 may include card images (e.g., reference numeral 1010-1) for a plurality of cards registered in the payment application.

According to an embodiment, while the GUI 1010 is displayed, the electronic device 10 may receive a user input, and detect that the foldable housing is folded into the fully folded state at substantially the same time as the user input is received or after the user input is received. For example, the user input may include at least one of a touch input 1011 detected on at least a partial area of the sub-display 190, a user input 1012 detected on the fingerprint recognition sensor, or a user input 1013 of selecting one (e.g., reference numeral 1010-1) from a plurality of card images represented by the GUI 1010. According to another embodiment, the electronic device 10 may detect that the foldable housing is folded at a specified threshold speed or more without receiving any user inputs.

When the foldable housing is folded into the fully folded state, in operation 1001-2, the electronic device 10 may execute the payment application and perform the payment function. For example, the payment function may mean a function that allows the electronic device 10 to make a payment with an external electronic device (e.g., a card payment device) using the information about a currently used card (e.g., the card corresponding to the card image 1010-1).

According to an embodiment, the electronic device 10 may display at least a portion of a card image (e.g., 1010-1) for the currently used card on the sub-display 190 to represent that a payment function is performed. The card currently used by the payment application may be selected by a user input (e.g., reference numeral 1013) or may be selected by the electronic device 10 based on usage history. For example, the electronic device 10 may select the most recently used card or the most frequently used card.

According to an embodiment, after the foldable housing is folded into the fully folded state, the electronic device 10 may execute the payment function the particular user inputs described above. For example, when the foldable housing is folded at the specified threshold speed or more without receiving any user inputs (e.g., reference numerals 1011, 1012, and 1013), in operation 1001-3, the electronic device 10 may display a plurality of card images on the sub-display 190. When a user input 1014 is received to select one (e.g., 1010-1) of the card images on the sub-display 190, in operation 1001-2, the electronic device 10 may execute the payment function by using the selected card.

Figure 10B:
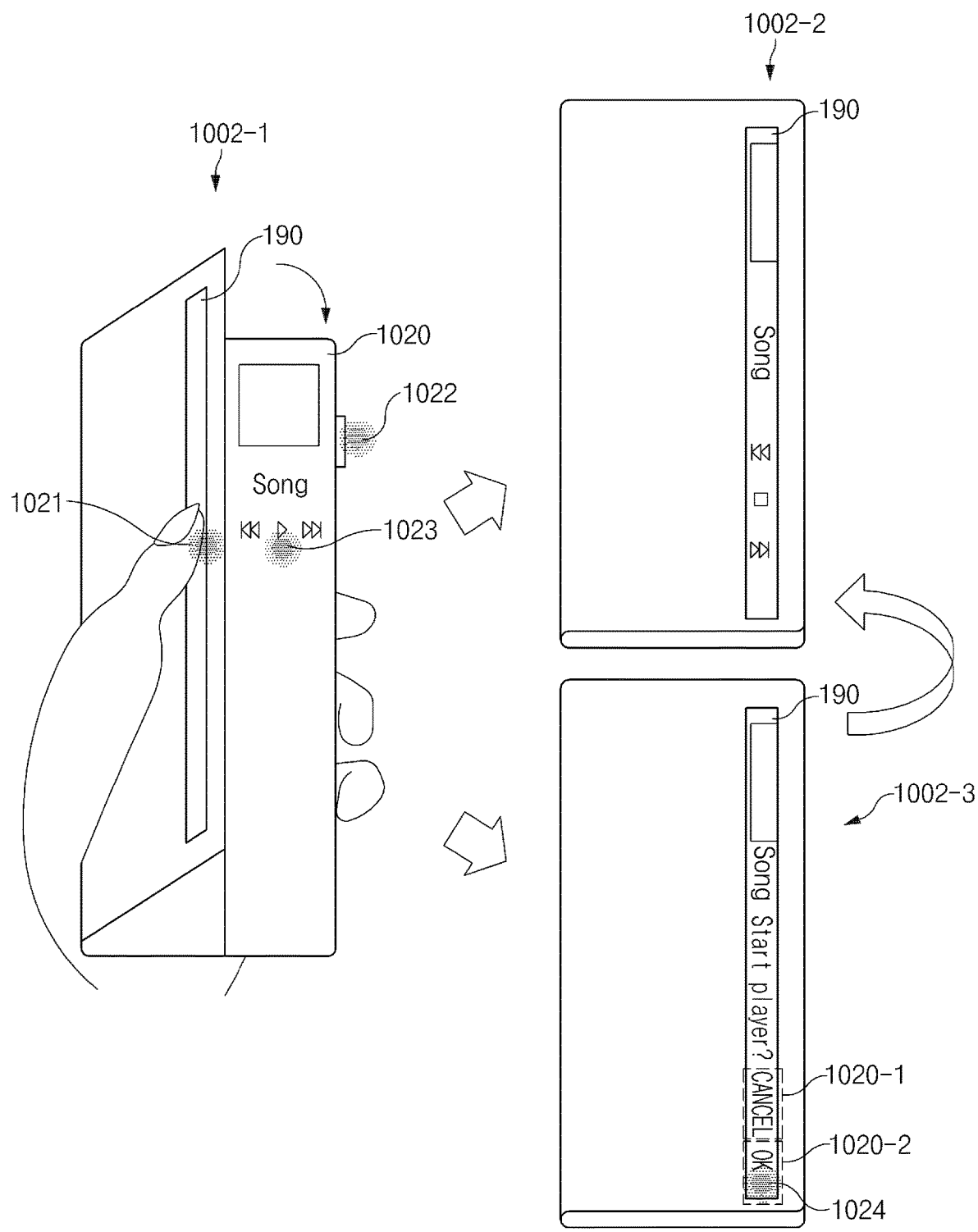
FIG. 10B is a view illustrating an operation for executing a music application according to an embodiment.

FIG. 10B is a view illustrating an operation for executing a music application.

Referring to FIG. 10B, in operation 1002-1, the electronic device 10 may display, on at least a partial area (e.g., reference numeral 415 of FIG. 4) of the display 100, a GUI 1020 for controlling a music application based on a folding angle of the foldable housing (e.g., reference numeral 200 of FIG. 1) or a user input (e.g., the swipe input 850 of FIG. 8). According to an embodiment, the GUI 1020 may show information (e.g., an image or name) associated with a recently reproduced music file and objects for controlling operations of the music application (e.g., playback, rewind, and fast forward).

According to an embodiment, while the GUI 1020 is displayed, the electronic device 10 may receive a user input, and detect that the foldable housing is folded into the fully folded state at substantially the same time as the user input is received or after the user input is received. For example, the user input may include at least one of a touch input 1021 detected on at least a portion of the sub-display 190, a user input 1022 detected on the fingerprint recognition sensor, or a user input (e.g., 1023) for selecting one of the objects controlling the operation of the music application. According to another embodiment, the electronic device 10 may detect that the foldable housing is folded at a specified threshold speed or more without receiving any user inputs.

When the foldable housing is folded into a fully folded state, at operation 1002-2, the electronic device 10 can execute a music application and play a music file. According to an embodiment, the electronic device 10 may display, on the sub-display 190, information associated with the currently playing music file to indicate that the music file is being played back and objects for controlling the operations (e.g., pause, rewind, and fast forward) of the music application.

According to an embodiment, after the foldable housing is folded into the fully folded state, the electronic device 10 may execute the music application or reproduce music file corresponding to a user input. For example, when the foldable housing is folded at the specified threshold speed or more without receiving any user inputs (e.g., reference numerals 1021, 1022, and 1023), in operation 1002-3, the electronic device 10 may display objects for allowing a user to select (e.g., reference numerals 1020-1 and 1020-2) whether to play the music file. When the user input 1024 for selecting the object for playing back the music file from the displayed objects is received, in operation 1002-2, the electronic device 10 may execute the music application or play the music file.

Figure 10C:
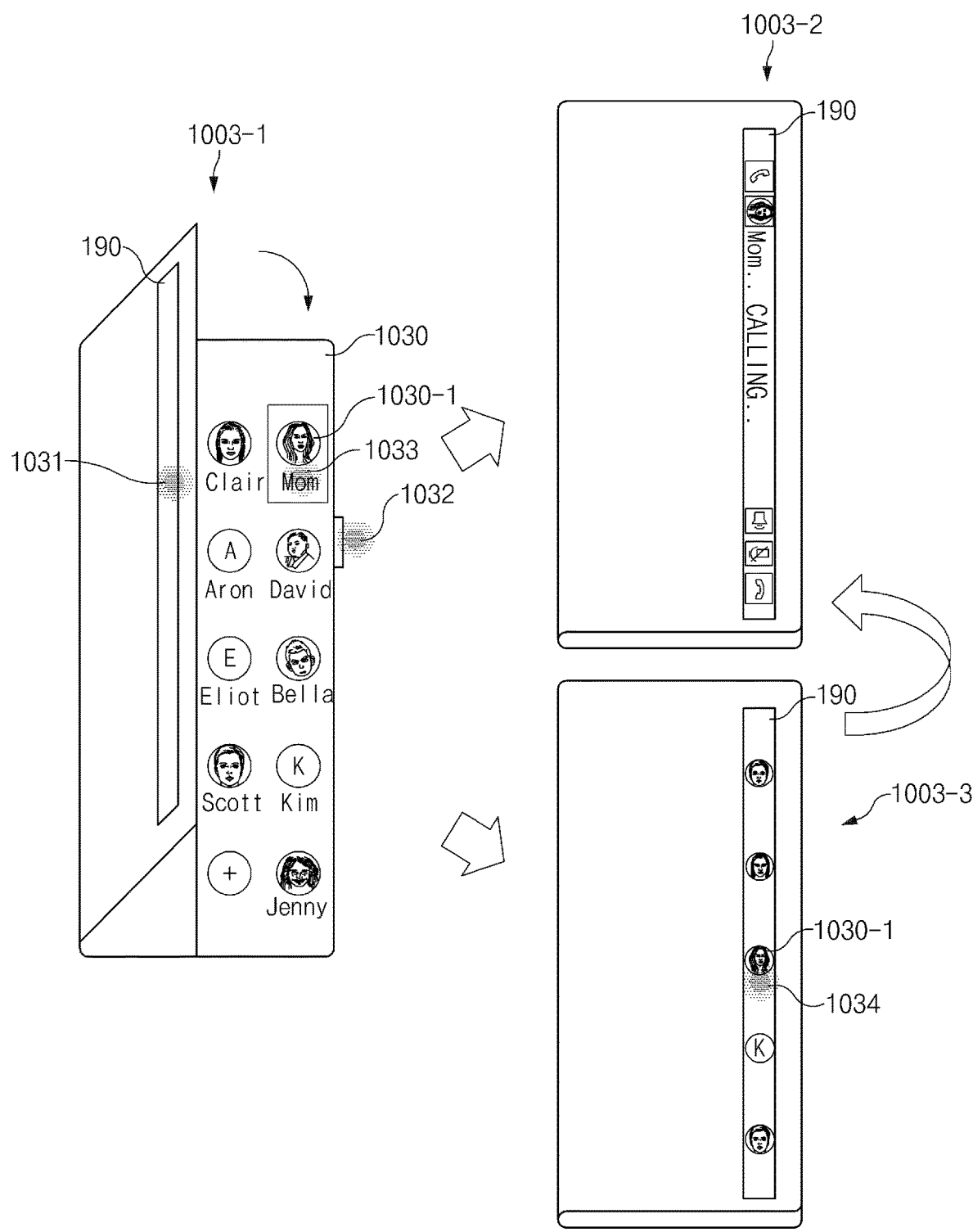
FIG. 10C is a view illustrating an operation of executing a contact application according to an embodiment.

FIG. 10C is a view illustrating an operation of executing a contact application.

Referring to FIG. 10C, in operation 1003-1, the electronic device 10 may display, on at least a partial area (e.g., reference numeral 415 of FIG. 4) of the display 100, a GUI 1030 for controlling a contact application based on a folding angle of the foldable housing (e.g., reference numeral 200 of FIG. 1) or a user input (e.g., the swipe input 850 of FIG. 8). According to an embodiment, the GUI 1030 may show various pieces of contact information (e.g., names, images of faces, telephone numbers, etc.).

According to an embodiment, while the GUI 1030 is displayed, the electronic device 10 may receive a user input, and detect that the foldable housing is folded into the fully folded state at substantially the same time as the user input is received or after the user input is received. For example, the user input may include at least one of a touch input 1031 detected on at least a partial area of the sub-display 190, a user input 1032 detected on the fingerprint recognition sensor, or a user input (e.g., reference numeral 1033) of selecting one (e.g., reference numeral 1030-1) from the plurality of pieces of contact information. According to another embodiment, the electronic device 10 may detect that the foldable housing is folded at a specified threshold speed or more without receiving any user inputs.

When the foldable housing is folded into the fully folded state, in operation 1003-2, the electronic device 10 may execute the contact application and attempt to establish a telephone connection. The contact information (e.g., 1030-1) from which the electronic device 10 attempts to establish the telephone connection may be selected by a user input (e.g., reference numeral 1033) or may be selected by the electronic device 10 based on the usage history. For example, the electronic device 10 may select the contact information which has been recently used to attempt to establish the telephone connection.

According to an embodiment, after the foldable housing is folded into the fully folded state, the electronic device 10 may execute the contact application or attempt to establish a telephone connection corresponding to a user input. For example, when the foldable housing is folded at the specified threshold speed or more without receiving any user inputs (e.g., reference numerals 1031, 1032, and 1033), in operation 1003-3, the electronic device 10 may display various pieces of contact information on the sub-display 190. When a user input 1034 for selecting one piece of contact information from the pieces of contact information (e.g., 1030-1) is received, in the operation 1003-2, the electronic device 10 may execute the contact application or attempt to establish a telephone connection.

Figure 10D:
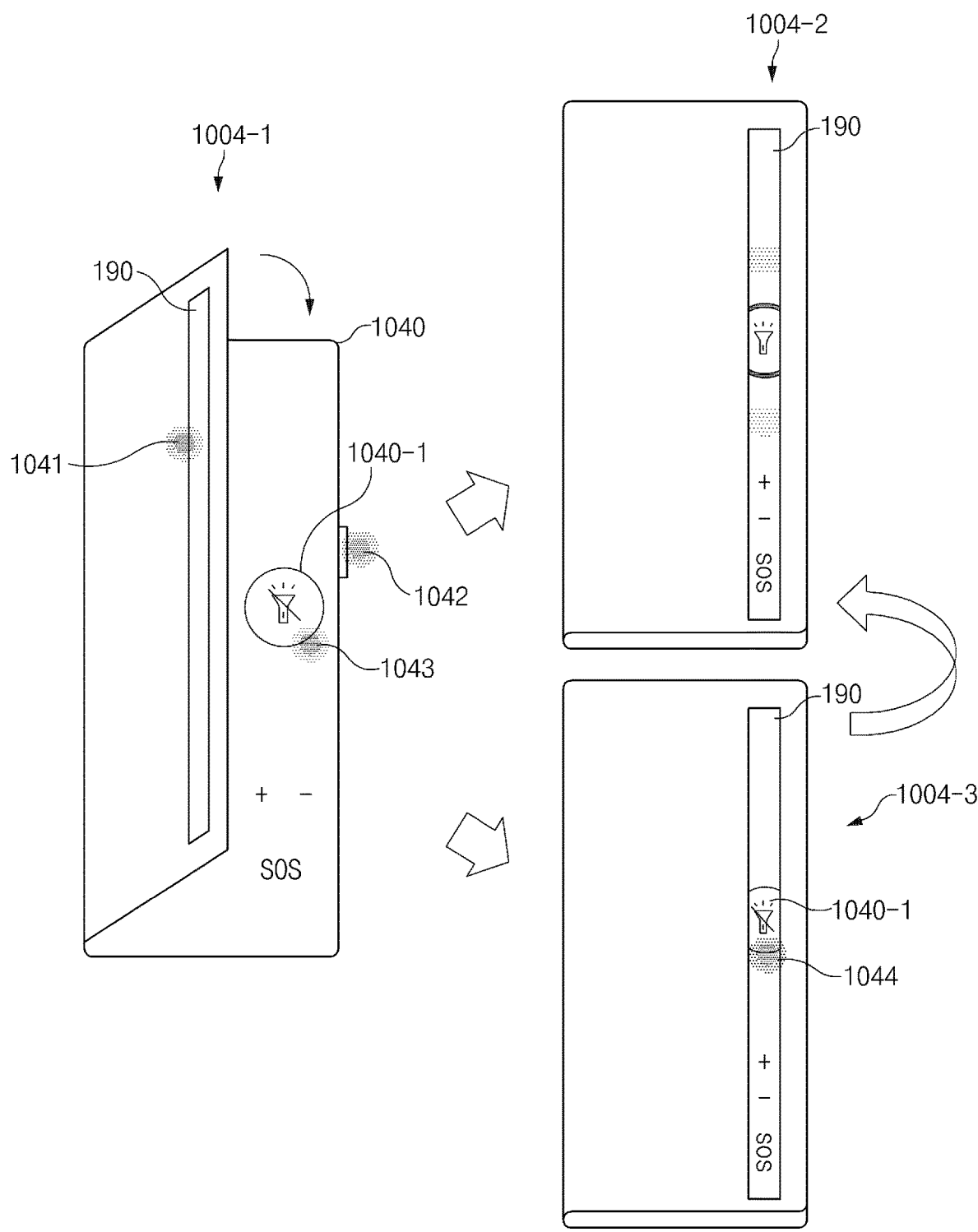
FIG. 10D is a view illustrating an operation for executing a voice recording application according to an embodiment.

FIG. 10D is a view illustrating an operation for executing a voice recording application.

Referring to FIG. 10D, in operation 1004-1, the electronic device 10 may display, on at least a partial area (e.g., reference numeral 415 of FIG. 4) of the display 100, a GUI 1040 for controlling a voice recording application based on a folding angle of the foldable housing (e.g., reference numeral 200 of FIG. 1) or a user input (e.g., the swipe input 850 of FIG. 8). According to an embodiment, the GUI 1040 may include an object representing a voice recording state (e.g., waiting for recording, recording, or stop recording).

According to an embodiment, while the GUI 1020 is displayed, the electronic device 10 may receive a user input, and detect that the foldable housing is folded into the fully folded state at substantially the same time as the user input is received or after the user input is received. For example, the user input may include at least one of a touch input 1041 detected on at least a portion of the sub-display 190, a user input 1042 detected on the fingerprint recognition sensor, or a user input (e.g., 1043) for selecting the object representing a voice recording state. According to another embodiment, the electronic device 10 may detect that the foldable housing is folded at a specified threshold speed or more without receiving any user inputs.

When the foldable housing is folded into the fully folded state, in operation 1004-2, the electronic device 10 may execute the voice recording application and begin voice recording. The electronic device 10 may change the color of the object representing the voice recording state, which is displayed on the sub-display 190 to indicate the beginning of the voice recording.

According to an embodiment, the electronic device 10 may execute the voice recording application or start voice recording corresponding to a user input after the foldable housing is folded into the fully folded state. For example, when the foldable housing is folded at the specified threshold speed or more without receiving any user inputs (e.g., reference numerals 1041, 1042, and 1043), in operation 1004-3, the electronic device 10 may display the object indicating the voice recording state on the sub-display 190. In this case, the object may indicate that the voice recording is waiting to be started. When a user input 1044 for selecting an object is received, in operation 1004-2, the electronic device 10 may execute the voice recording application to begin voice recording.

Figure 11:
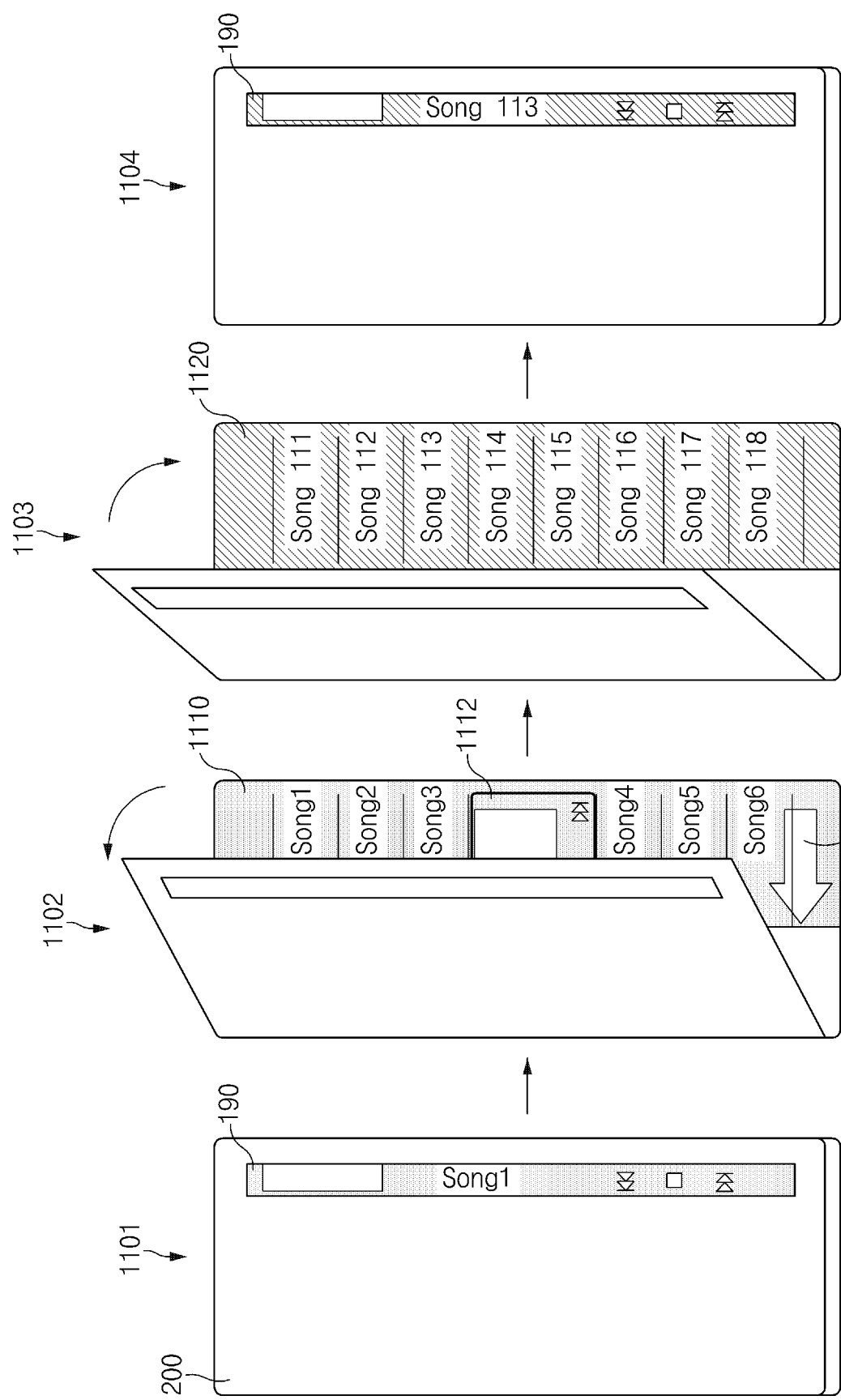
FIG. 11 is a view illustrating an unfolding sensing operation of a foldable housing while an application is executed according to an embodiment.

FIG. 11 is a view illustrating an unfolding sensing operation of the foldable housing 200 while an application is executed according to an embodiment.

Referring to FIG. 11, when the folding angle of the foldable housing 200 is changed after an application is executed, the electronic device 10 may change the GUI of the executing application.

In operation 1101, the foldable housing 200 of the electronic device 10 may be in the fully folded state. For example, when the application executed in the electronic device 10 is a music application, a music file may be being played back (e.g., the operation 1002-2 of FIG. 10B).

In operation 1102, the electronic device 10 may detect that the foldable housing 200 is folded to a first angle (e.g., 'A' of FIG. 4) from the fully folded state while the music application is executed (i.e. the music file is playing). In response to sensing that the foldable housing 200 is unfolded to the first angle, the electronic device 10 may display, on at least a partial area (e.g., reference numeral 415 of FIG. 4) of the display 100, a first GUI 1110 of the executing application. For example, when the executing application is a music application, the first GUI 1110 may show a first list of a plurality of music files. According to an embodiment, the first GUI 1110 may include information associated with the currently playing music file and an object (e.g., reference numeral 1112) for controlling the operation (e.g., pause, rewind, and fast forward) of the music application.

In operation 1103, the electronic device 10 may detect that the foldable housing 200 is unfolded to a second angle greater than the first angle or folded to third angle less than the first angle while the first GUI 1110 is displayed. The electronic device 10 may scroll the first GUI 1110 to a second GUI 1120 based on whether the foldable housing 200 is further unfolded or folded. According to an embodiment, the second GUI 1120 may represent a second list of a plurality of music files which are at least partially different from the music files included in the first list. According to another embodiment, based on whether the foldable housing 200 is folded or unfolded and a user input (e.g., reference numeral 1150) for scrolling the first GUI 1110, the electronic device 10 may scroll the first GUI 1110 to the second GUI 1120.

In operation 1104, while the second GUI 1120 is displayed, the electronic device 10 may detect that the foldable housing 200 is folded into the fully folded state. When the foldable housing 200 is folded into the fully folded state, the electronic device 10 may reproduce the music files included in the second list.

Figure 12:
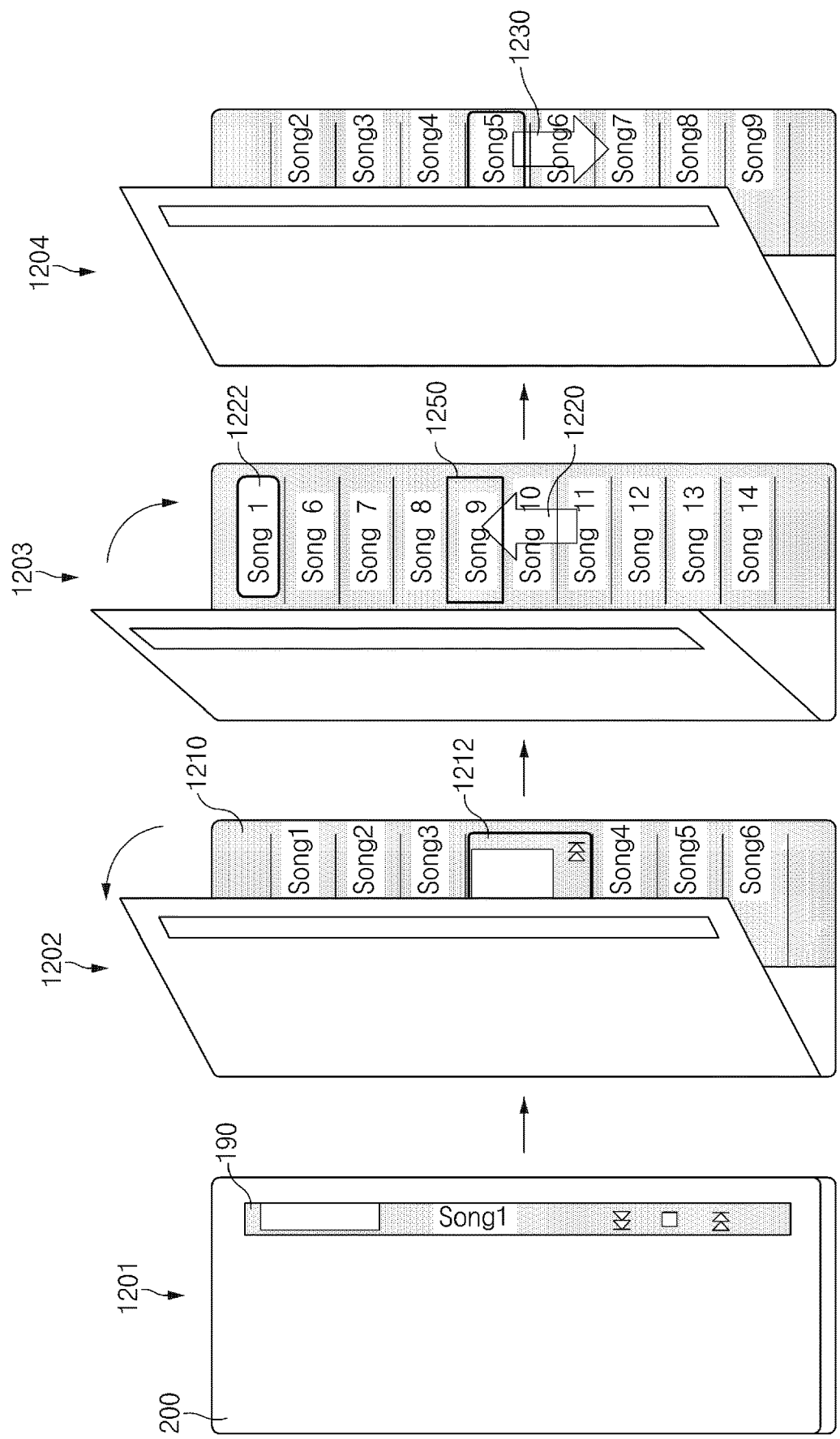
FIG. 12 is a view illustrating another unfolding sensing operation of a foldable housing while an application is executed according to an embodiment.

FIG. 12 is a view illustrating another unfolding sensing operation of the foldable housing 200 while an application is executed according to an embodiment.

Referring to FIG. 12, when the folding angle of the foldable housing 200 is changed after an application is executed, the electronic device 10 may perform a scrolling operation of the GUI of the executing application based on the folding and unfolding.

In operation 1201, the foldable housing 200 of the electronic device 10 may be in the fully folded state. When the application executed in the electronic device 10 is a music application, a music file may be being playing back (e.g., the operation 1002-2 of FIG. 10B).

In operation 1202, the electronic device 10 may detect that the foldable housing 200 is unfolded to a first angle (e.g., 'A' of FIG. 4) from the fully folded state while the music application is executed (i.e. the music file is playing back). In response to sensing that the foldable housing 200 is unfolded to the first angle, the electronic device 10 may display, on at least a partial area (e.g., reference numeral 415 of FIG. 4) of the display 100, a first GUI 1210 of the executing application. For example, when the executing application is a music application, the GUI 1210 may show a list of a plurality of music files. According to an embodiment, the GUI 1210 may include information associated with the currently playing music file and an object (e.g., reference numeral 1212) for controlling the operation (e.g., pause, rewind, and fast forward) of the music application.

In operation 1203, the electronic device 10 may detect that the foldable housing 200 is unfolded to a second angle greater than the first angle while the GUI 1210 is displayed. The electronic device 10 may scroll the list in the GUI 1210 in an upward direction 1220 based on the unfolding of the foldable housing 200. According to another embodiment, the electronic device 10 may scroll the list in the GUI 1210 based on the user input for scrolling the GUI 1210 in the upward direction when the foldable housing 200 is not further unfolded.

According to an embodiment, while the list in the GUI 1210 is scrolled, the electronic device 10 may display, on an upper end of the GUI 1210, information 1222 associated with the currently reproducing music file, or an indicator 1250 indicating a currently selected music file in the list of music files.

In operation 1204, the electronic device 10 may detect that the foldable housing 200 is folded to a third angle less than the first angle. The electronic device 10 may scroll the list in the GUI 1210 in the downward direction 1230 based on the folding of the foldable housing 200. According to another embodiment, the electronic device 10 may scroll the list in the GUI 1210 based on the user input for scrolling the GUI 1210 in the downward direction when the foldable housing 200 is not further folded.

Figure 13:
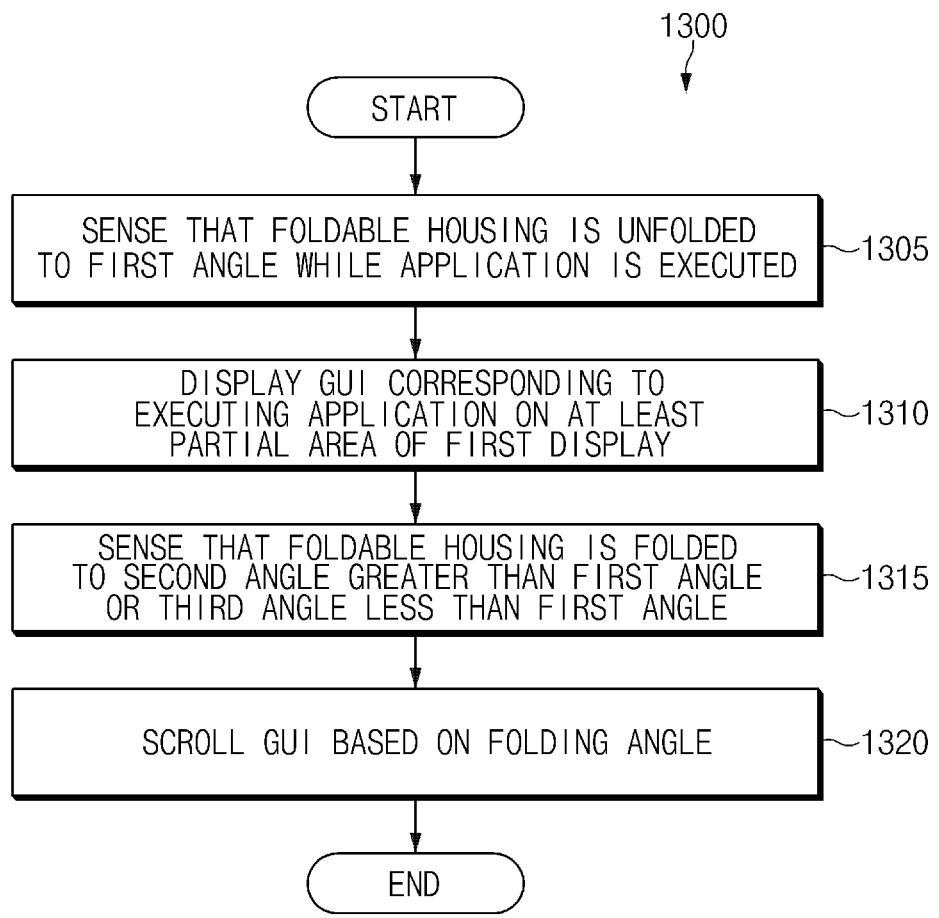
FIG. 13 is a flowchart illustrating an operation of an electronic device that detects unfolding of a foldable housing while an application is executed according to an embodiment.

FIG. 13 is a flowchart 1300 illustrating an operation of the electronic device 10 for detecting unfolding of a foldable housing while an application is executed according to an embodiment. Operations illustrated in FIG. 13 may be performed after operation 630 of FIG. 6 or may be performed independently of the operations of the flowchart 600.

Referring to FIG. 13, in operation 1305, the electronic device 10 may detect that the foldable housing (e.g., reference numeral 200 of FIG. 1) is unfolded to a first angle while the application is executed.

In operation 1310, the electronic device 10 may display a GUI (e.g., reference numeral 1110 of FIG. 11 or reference numeral 1210 of FIG. 12) corresponding to the executing application on at least a partial area (e.g., reference numeral 415 of FIG. 4) of a first display (e.g., the display 100 of FIG. 1).

In operation 1315, the electronic device 10 may detect that the foldable housing is unfolded to a second angle greater than the first angle, or folded to a third angle less than the first angle. According to another embodiment, the electronic device 10 may receive a user input (e.g., a swipe input) that scrolls the GUI while the folding angle of the foldable housing is maintained.

In operation 1320, the electronic device 10 may scroll the GUI in a specified direction based on the changed folding angle.

In the embodiments described below, the electronic device 10 may receive an external event while the foldable housing 200 is folded in the fully folded state. For example, the external event may include at least one of a message, an e-mail, a missed call, or news information. The electronic device 10 may display the received external event based on the folding angle of the foldable housing 200.

Figure 14:
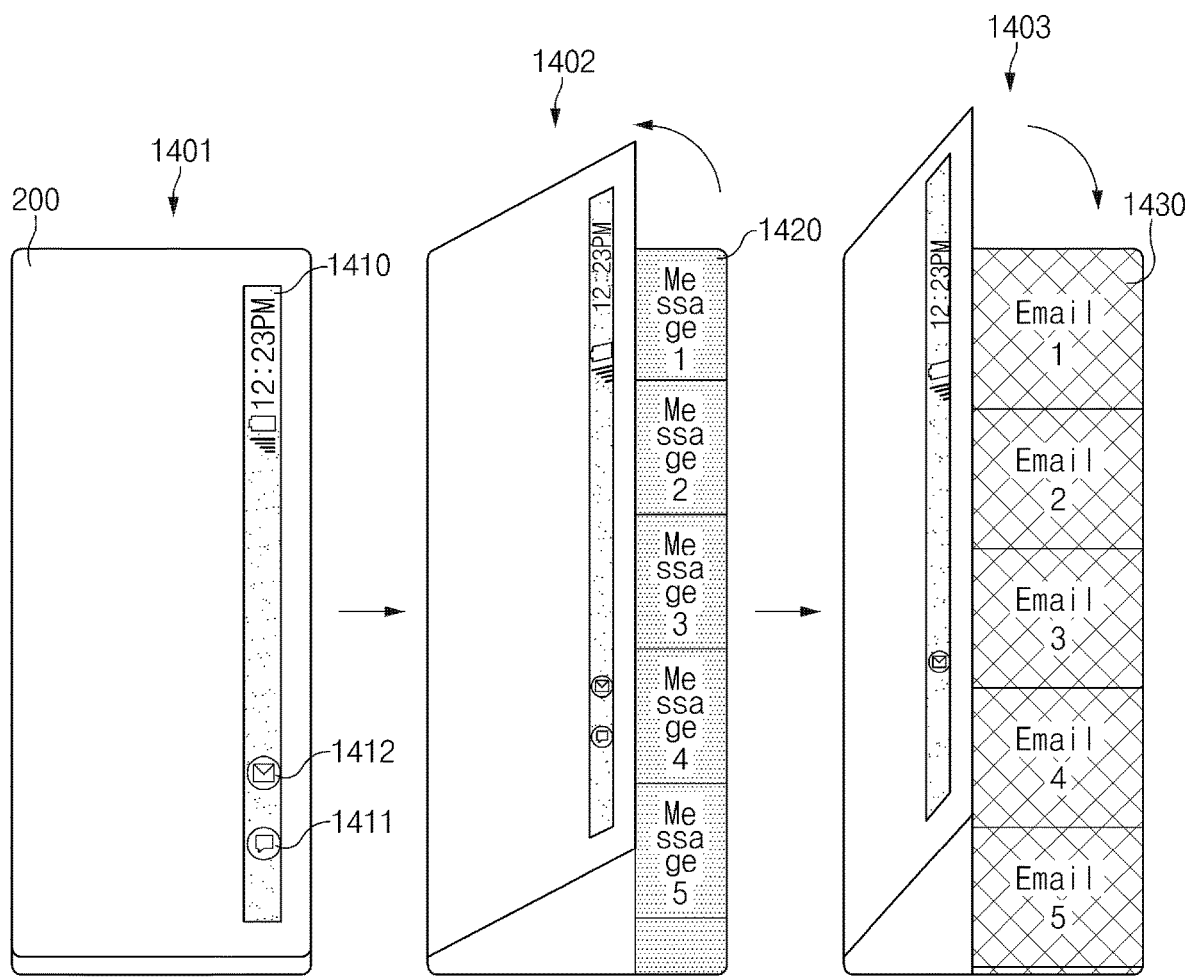
FIG. 14 is a view illustrating an operation of displaying received message information based on a folding angle according to an embodiment.

FIG. 14 is a view illustrating the operation of displaying received message information based on a folding angle according to an embodiment.

Referring to FIG. 14, in operation 1401, the electronic device 10 may receive a message (e.g. SMS message) and an e-mail from an external electronic device (e.g., reference numeral 302, 304, or 308 of FIG. 3) when the foldable housing 200 is folded in the fully folded state. The electronic device 10 may display a GUI 1410 on the sub-display 190 to inform the user of the receipt of the message and e-mail. The GUI 1410 may be referred to as a notification bar. The GUI 1410 may include a first icon 1411 indicating that the message is received and a second icon 1412 indicating that the e-mail is received.

In operation 1402, the electronic device 10 may detect that the foldable housing 200 is unfolded to a first angle (e.g., 'A' of FIG. 4) from the fully folded state. In response to sensing that the foldable housing 200 is unfolded, the electronic device 10 displays, on a partial area (e.g., reference numeral 415 of FIG. 4) of the display 100, a first GUI 1420 showing a list of a plurality of messages.

In operation 1403, the electronic device 10 may detect that the foldable housing 200 is unfolded from the first angle to the second angle (e.g., 'B' of FIG. 4) greater than the first angle. The electronic device 10 may scroll the first GUI 1420 off the partial area of the display to a second GUI 1430 based on the folding angle change of the foldable housing 200. According to an embodiment, the second GUI 1430 may display a list of a plurality of e-mails. According to an embodiment, the electronic device 10 may provide a visual effect where the first icon 1411 is removed from the sub-display 190 while the second GUI 1430 is displayed.

Figure 15:
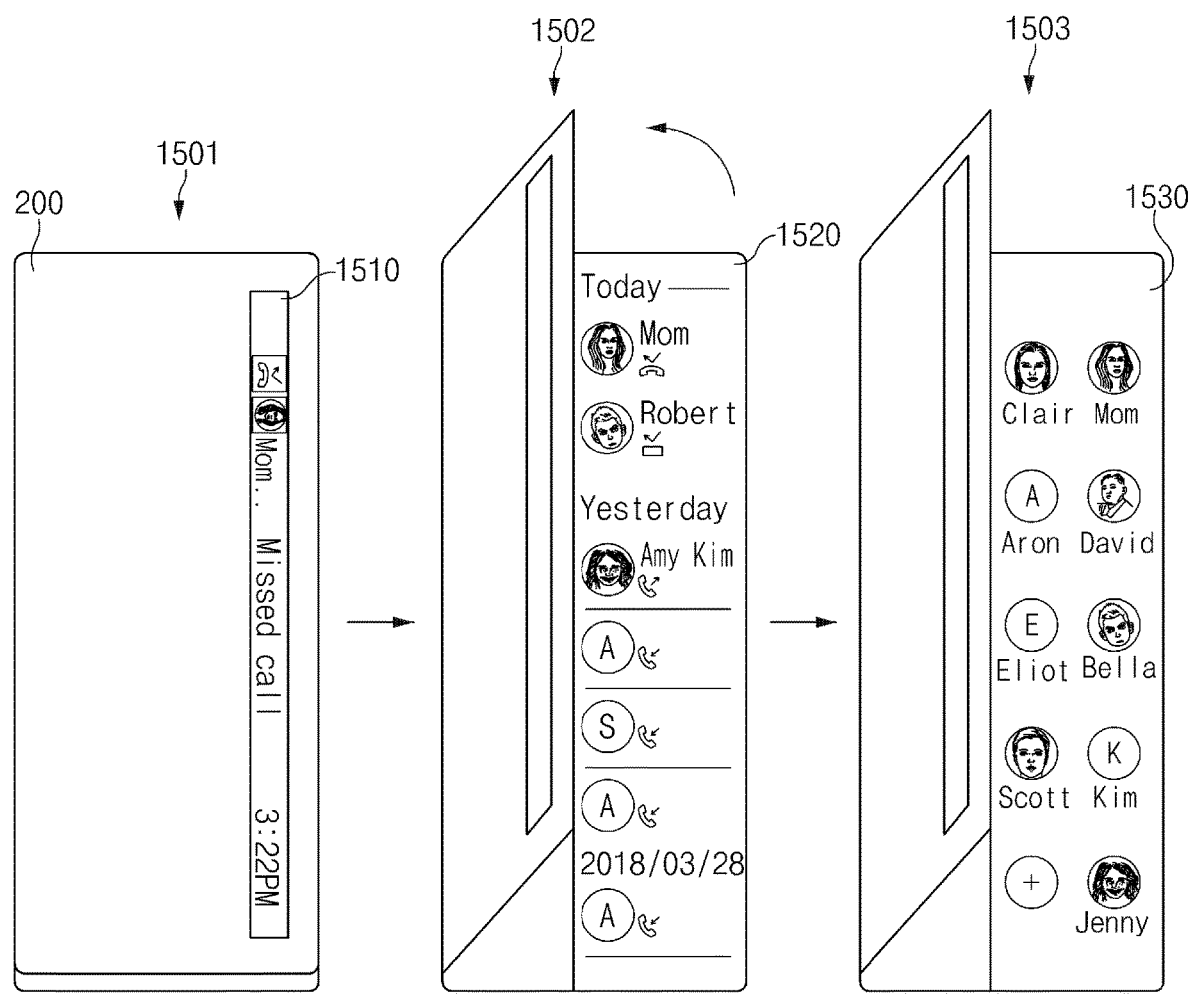
FIG. 15 is a view illustrating an operation of displaying received call information based on a folding angle according to an embodiment.

FIG. 15 is a view illustrating an operation of displaying received call information based on a folding angle according to an embodiment.

Referring to FIG. 15, in operation 1501, the electronic device 10 may detect that a missed call occurred while the foldable housing 200 is folded in the fully folded state. The electronic device 10 may display, on the sub-display 190, a GUI 1510 to inform the user of the occurrence of a missed call.

In operation 1502, the electronic device 10 may detect that the foldable housing 200 is unfolded to a first angle (e.g., 'A' in FIG. 4) from the fully folded state. In response to sensing that the foldable housing 200 is unfolded, the electronic device 10 may display a first GUI 1520 showing a list of various pieces of call information on a partial area (e.g., reference numeral 415 of FIG. 4) of the display 100.

In operation 1503, the electronic device 10 may detect that the foldable housing 200 is unfolded from the first angle to a second angle (e.g., 'B' of FIG. 4) that is greater than the first angle. The electronic device 10 may scroll the first GUI 1520 to a second GUI 1530 based on the folding angle change of the foldable housing 200. According to an embodiment, the second GUI 1530 may be a GUI (e.g., reference numeral 1030 in FIG. 10C) for controlling a contact application.

Figure 16:
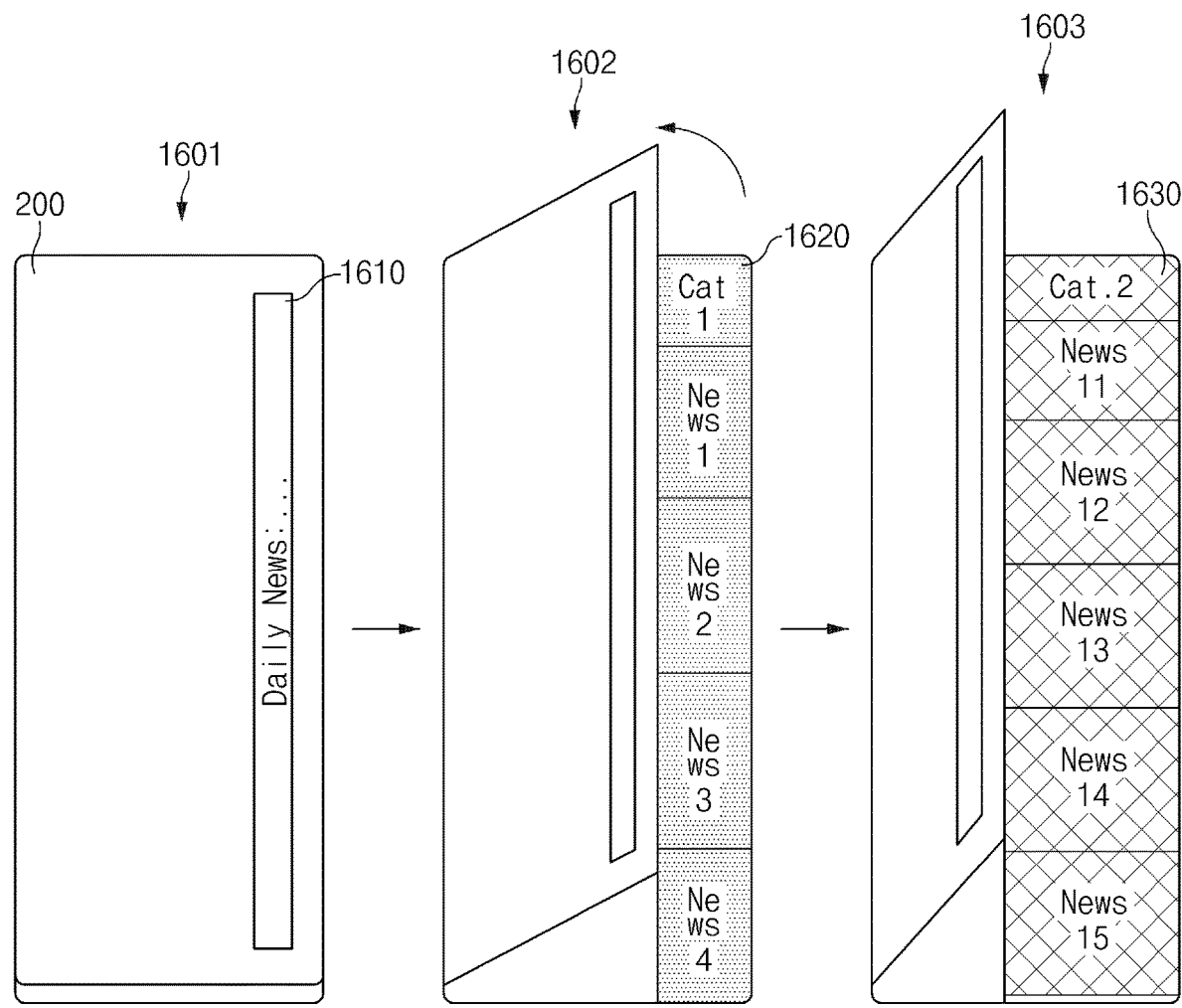
FIG. 16 is a view illustrating an operation of displaying received news information based on a folding angle according to an embodiment.

FIG. 16 is a view illustrating an operation of displaying received news information based on a folding angle according to an embodiment.

Referring to FIG. 16, in operation 1601, the electronic device 10 may receive news information while the foldable housing 200 is folded in the fully folded state. The electronic device 10 may display a GUI 1610 on the sub-display 190 to inform the user of the receipt of the news information. For example, the GUI 1610 may show a headline of the received news information.

In operation 1602, the electronic device 10 may detect that the foldable housing 200 is unfolded to a first angle (e.g., 'A' of FIG. 4) from the fully folded state. In response to sensing that the foldable housing 200 is unfolded, the electronic device 10 may display, on a partial area (e.g., reference numeral 415 of FIG. 4) of the display 100, a first GUI 1620 showing a list of various pieces of news information.

In operation 1603, the electronic device 10 may detect that the foldable housing 200 is unfolded from the first angle to a second angle (e.g., 'B' of FIG. 4) that is greater than the first angle. The electronic device 10 may scroll the first GUI 1620 to a second GUI 1630 based on the folding angle change of the foldable housing 200. According to an embodiment, the second GUI 1630 may also display a list of various pieces of news information, but the categories (e.g., society, politics, economy, or sports) of the news information in the second GUI 1630 may be different from that of the first GUI 1620.

Figure 17:
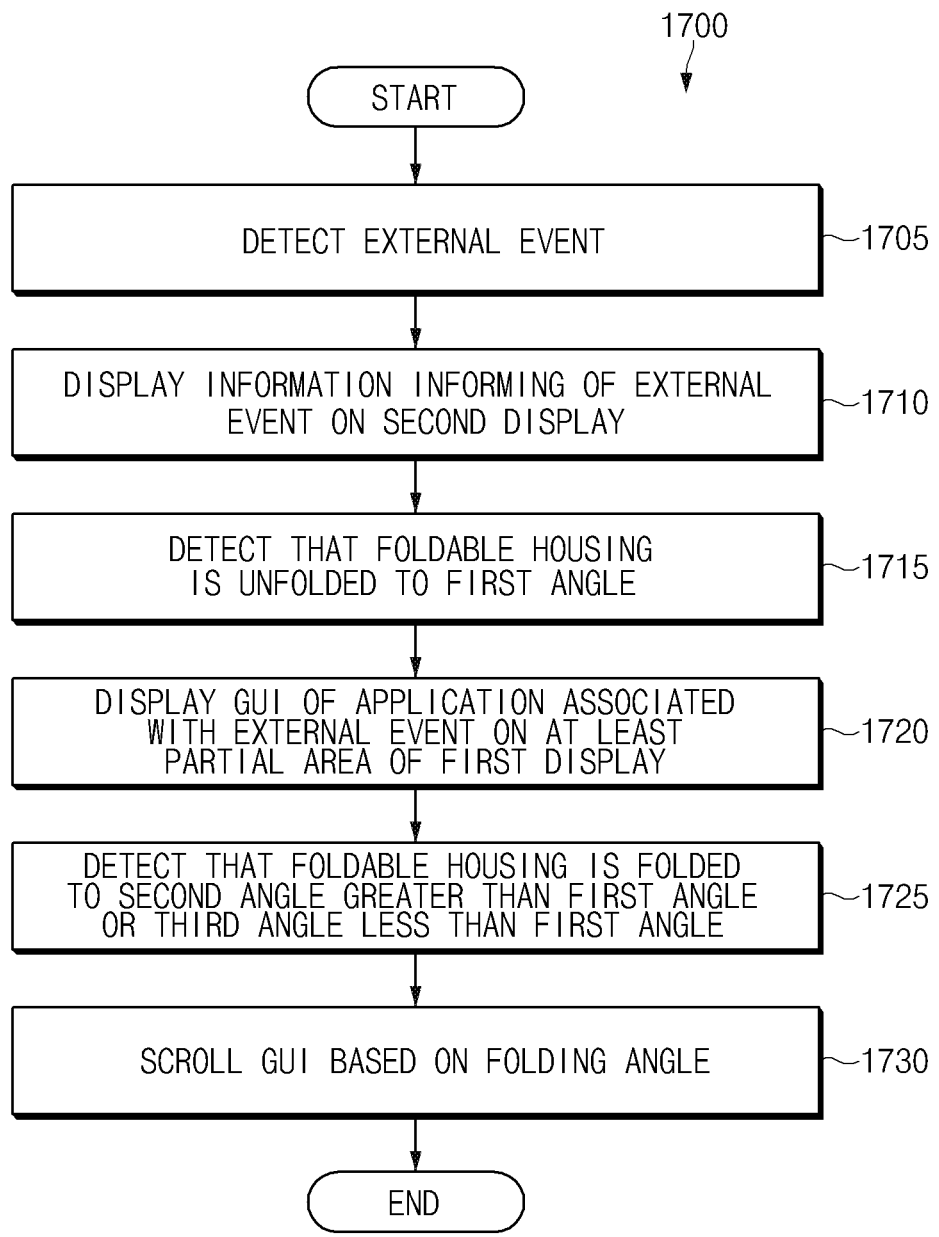
FIG. 17 is a flowchart illustrating an operation of an electronic device that displays a received external event based on a folding angle according to an embodiment.

FIG. 17 is a flowchart 1700 illustrating an operation of the electronic device 10 that displays a received external event based on a folding angle according to an embodiment. The operations illustrated in FIG. 17 may be performed after operation 630 illustrated in FIG. 6 or may be performed independently of the operations of the flowchart 600.

Referring to FIG. 17, in operation 1705, the electronic device 10 may detect an external event when the foldable housing (e.g., reference numeral 200 of FIG. 1) is folded into the fully folded state.

In operation 1710, the electronic device 10 may display, on the second display (e.g., the sub-display 190 of FIG. 1), information (e.g., reference numeral 1410 of FIG. 14, reference numeral 1510 of FIG. 15, or reference numeral 1610 of FIG. 16) for informing the user of the external event.

In operation 1715, the electronic device 10 may detect that the foldable housing is unfolded to a first angle from the fully folded state.

In operation 1720, the electronic device 10 may display, on at least a partial area (e.g., reference numeral 415 of FIG. 4) of a first display (e.g., the display 100 of FIG. 1), a GUI (e.g., reference numeral 1420 in FIG. 14, reference numeral 1520 of FIG. 15, or reference numeral 1620 in FIG. 16) of an application associated with the external event.

In operation 1725, the electronic device 10 may detect that the foldable housing is unfolded to a second angle greater than the first angle or is folded at a third angle less than the first angle. According to another embodiment, the electronic device 10 may receive a user input (e.g., a swipe input) for scrolling the GUI the folding angle of the foldable housing is maintained.

In operation 1730, the electronic device 10 may scroll the GUI based on the angle of the further folding or unfolding.

As described above, an electronic device (e.g., reference numeral 10 of FIG. 1) may include a foldable housing (e.g., reference numeral 200 of FIG. 1) including a first surface and a second surface opposite to the first surface, a first display (e.g., reference numeral 100 of FIG. 1) arranged on the first surface and configured to be flexible, a second display (e.g., reference numeral 190 of FIG. 1) arranged in at least a partial area of the second surface, and a processor (e.g., reference numeral 330 of FIG. 3) arranged inside the foldable housing, where the processor may detect that the foldable housing is unfolded to a first angle from a fully folded state, display a first graphic user interface (GUI) associated with a first application on at least a partial area of the first display, detect that the foldable housing is unfolded to a second angle greater than the first angle, display a second GUI associated with a second application, and execute the second application when the foldable housing is folded back into the fully folded state.

According to an embodiment, the electronic device may further include a fingerprint recognition sensor arranged outside the foldable housing, and the processor may receive a first user input while the second GUI is displayed when the foldable housing is unfolded at the second angle, the first user input may include a touch input received on at least a partial area of the second GUI, a touch input received on the second display, or an input received on the fingerprint recognition sensor.

According to an embodiment, the processor may provide a visual effect to remove the second GUI from the first display when the foldable housing is unfolded to more than a specified threshold angle.

According to an embodiment, the second application may be a payment application, where the second GUI may include card images corresponding a plurality of cards registered in the payment application, and the processor may display, on the second display, at least a portion of a card image selected by the first user input from the card images when the foldable housing is folded into the fully folded state.

According to an embodiment, the second application may be a music application, where the second GUI may display information associated with a music file, and the processor may play back the music file when the second application is executed and display, on the second display, at least part of the information associated with the music file when the foldable housing is folded into the fully folded state.

According to an embodiment, the processor may detect that the foldable housing is unfolded to the first angle from the fully folded state while the music file is playing back, display, on at least the partial area of the first display, a third GUI showing a list of a plurality of music files including the music file, detect that the foldable housing is unfolded to the second angle, and scroll the list displayed in the third GUI.

According to an embodiment, the second application may be a contact application, where the second GUI may display information about a plurality of contacts registered in the contact application.

According to an embodiment, the processor may initiate a call with a contact selected by the first user input from the plurality of contacts when the second application is executed.

According to an embodiment, the processor may display information about the plurality of contacts on the second display when the second application is executed, receive a second user input for selecting a contact from the plurality of contacts whose information is displayed on the second display, and initiate a call with the selected contact in response to the second user input.

According to an embodiment, the second application may be a voice recording application, the second GUI may include a GUI object representing a voice recording state, and the processor may start voice recording when the second application is executed.

As described above, a method of an electronic device may include detecting that the electronic device is unfolded to a first angle from a fully folded state, displaying a first graphic user interface (GUI) associated with a first application on at least a partial area of a first display of the electronic device, detecting that the electronic device is unfolded to a second angle greater than the first angle, displaying a second GUI associated with a second application, and executing the second application when the electronic device is folded back into the fully folded state.

According to an embodiment, the method may further include receiving a first user input while the second GUI is displayed when the electronic device is unfolded at the second angle, where the first user input may be a touch input on a second display of the electronic device.

According to an embodiment, the method may further include providing a visual effect to remove the second GUI from the first display when the electronic device is unfolded to more than a specified threshold angle.

According to an embodiment, the second application may be a payment application and the second GUI may include card images corresponding a plurality of cards registered in the payment application, wherein the method may further include displaying, on the second display, at least a portion of a card image selected by the first user input from the card images when the electronic device is folded into the fully folded state.

According to an embodiment, the second application may be a music application, and the second GUI may display information associated with a music file, wherein the method may further include playing back the music file when the second application is executed, and displaying, on the second display, at least part of the information associated with the music file.

According to an embodiment, the method may further include detecting that the electronic device is unfolded to the first angle from the fully folded state while the music file is playing back, displaying, on at least the partial area of the first display, a third GUI showing a list of a plurality of music files including the music file, sensing that the electronic device is unfolded to the second angle, and scrolling the list displayed in the third GUI.

According to an embodiment, the second application may be a contact application, and the second GUI may display information about a plurality of contacts registered in the contact application.

According to an embodiment, the method may further include initiating a call with a contact selected by the first user input from the plurality of contacts when the second application is executed.

According to an embodiment, the method may further include displaying information about the plurality of contacts on the second display when the second application is executed, receiving a second user input for selecting a contact from the plurality of contacts whose information is displayed on the second display, and initiating a call with the selected contact in response to the second user input.

According to an embodiment, the second application may be a voice recording application and the second GUI may include a GUI object representing a voice recording state, wherein the method may further include starting voice recording when the second application is executed.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to certain embodiments of the disclosure, an electronic device may provide the user with functionality such that an application may be controlled without fully unfolding the foldable housing.

According to certain embodiments of the disclosure, using the above features, the user may more efficiently operate the electronic device.

In addition, various other features or advantages that are directly or indirectly understood through the present disclosure may be provided.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a foldable housing including a first surface and a second surface opposite to the first surface;
   a first display disposed on the first surface and configured to be flexible;
   a non-flexible second display disposed on at least a partial area of the second surface; and
   a processor disposed inside the foldable housing,
   wherein the processor is configured to:
      detect that the foldable housing is unfolded to a first angle from a fully folded state,
      display a first graphic user interface (GUI) associated with a first application on at least a partial area of the first display,
      detect that the foldable housing is unfolded to a second angle greater than the first angle,
      display a second GUI associated with a second application on at least the same partial area of the first display, and
      execute the second application when the foldable housing is folded back into the fully folded state.

2. The electronic device of claim 1, further comprising:
   a fingerprint recognition sensor arranged outside the foldable housing,
   wherein the processor is further configured to receive a first user input while the second GUI is displayed when the foldable housing is unfolded at the second angle, the first user input including at least one of a touch input received on at least a partial area of the second GUI, a touch input received on the second display, or an input received on the fingerprint recognition sensor.

3. The electronic device of claim 2, wherein the second application is a payment application,
   wherein the second GUI includes card images corresponding a plurality of cards registered in the payment application, and
   wherein the processor is further configured to display, on the second display, at least a portion of a card image selected by the first user input from the card images when the foldable housing is folded into the fully folded state.

4. The electronic device of claim 2, wherein the second application is a music application,
   wherein the second GUI displays information associated with a music file, and
   wherein the processor is further configured to:
      play back the music file when the second application is executed, and
      display, on the second display, at least part of the information associated with the music file when the foldable housing is folded into the fully folded state.

5. The electronic device of claim 4, wherein the processor is further configured to:
   detect that the foldable housing is unfolded to the first angle from the fully folded state while the music file is playing back;
   display, on at least the partial area of the first display, a third GUI showing a list of a plurality of music files including the music file;
   detect that the foldable housing is unfolded to the second angle; and
   scroll the list displayed in the third GUI.

6. The electronic device of claim 2, wherein the second application is a contact application, and
   wherein the second GUI displays information about a plurality of contacts registered in the contact application.

7. The electronic device of claim 6, wherein the processor is further configured to initiate a call with a contact selected by the first user input from the plurality of contacts when the second application is executed.

8. The electronic device of claim 6, wherein the processor is further configured to:

display information about the plurality of contacts on the second display when the second application is executed;

receive a second user input for selecting a contact from the plurality of contacts whose information is displayed on the second display; and initiate a call with the selected contact in response to the second user input.

9. The electronic device of claim 2, wherein the second application is a voice recording application, wherein the second GUI includes a GUI object representing a voice recording state, and wherein the processor is further configured to start voice recording when the second application is executed.

10. The electronic device of claim 1, wherein the processor is further configured to provide a visual effect to remove the second GUI from the first display when the foldable housing is unfolded to more than a specified threshold angle.

11. A method of an electronic device, the method comprising:

detecting that the electronic device is unfolded to a first angle from a fully folded state;

displaying a first graphic user interface (GUI) associated with a first application on at least a partial area of a first display of the electronic device;

detecting that the electronic device is unfolded to a second angle greater than the first angle;

displaying a second GUI associated with a second application on at least the same partial area of the first display; and executing the second application when the electronic device is folded back into the fully folded state.

12. The method of claim 11, further comprising:

receiving a first user input while the second GUI is displayed when the electronic device is unfolded at the second angle, wherein the first user input is a touch input on a non-flexible second display of the electronic device.

13. The method of claim 12, wherein the second application is a payment application, wherein the second GUI includes card images corresponding a plurality of cards registered in the payment application, and wherein the method further comprises displaying, on the second display, at least a portion of a card image selected by the first user input from the card images when the electronic device is folded into the fully folded state.

14. The method of claim 12, wherein the second application is a music application, wherein the second GUI displays information associated with a music file, and wherein the method further comprises:

playing back the music file when the second application is executed, and displaying, on the second display, at least part of the information associated with the music file.

15. The method of claim 14, further comprising:

detecting that the electronic device is unfolded to the first angle from the fully folded state while the music file is playing back;

displaying, on at least the partial area of the first display, a third GUI showing a list of a plurality of music files including the music file;

sensing that the electronic device is unfolded to the second angle; and scrolling the list displayed in the third GUI.

16. The method of claim 12, wherein the second application is a contact application, and wherein the second GUI displays information about a plurality of contacts registered in the contact application.

17. The method of claim 16, further comprising:

initiating a call with a contact selected by the first user input from the plurality of contacts when the second application is executed.

18. The method of claim 16, further comprising:

displaying information about the plurality of contacts on the second display when the second application is executed;

receiving a second user input for selecting a contact from the plurality of contacts whose information is displayed on the second display; and initiating a call with the selected contact in response to the second user input.

19. The method of claim 12, wherein the second application is a voice recording application, wherein the second GUI includes a GUI object representing a voice recording state, and wherein the method further comprises starting voice recording when the second application is executed.

20. The method of claim 11, further comprising:

providing a visual effect to remove the second GUI from the first display when the electronic device is unfolded to more than a specified threshold angle.

* * * * *